(12) United States Patent
Ni et al.

(10) Patent No.: US 11,438,637 B2
(45) Date of Patent: *Sep. 6, 2022

(54) COMPUTERIZED SYSTEM AND METHOD FOR AUTOMATIC HIGHLIGHT DETECTION FROM LIVE STREAMING MEDIA AND RENDERING WITHIN A SPECIALIZED MEDIA PLAYER

(71) Applicant: YAHOO ASSETS LLC, Dulles, VA (US)

(72) Inventors: Bin Ni, Fremont, CA (US); Kirk Lieb, Sunnyvale, CA (US); Rick Hawes, Sunnyvale, CA (US); Yale Song, New York, NY (US); Benoit Schillings, Los Altos Hills, CA (US); Vahe Oughourlian, Sunnyvale, CA (US); Jordi Vallmitjana, New York, NY (US); Jennelle Nystrom, Sunnyvale, CA (US); Hardik Ruparel, Sunnyvale, CA (US); Michael Chen, Sunnyvale, CA (US); Adam Mathes, Sunnyvale, CA (US); Arunkumar Balasubramanian, Sunnyvale, CA (US); Jian Zhou, Sunnyvale, CA (US); Matt Edelman, Sunnyvale, CA (US)

(73) Assignee: YAHOO ASSETS LLC, Dulles (VA)

( * ) Notice: Subject to any disclaimer, the term of this patent is extended or adjusted under 35 U.S.C. 154(b) by 0 days.

This patent is subject to a terminal disclaimer.

(21) Appl. No.: 15/930,726

(22) Filed: May 13, 2020

(65) Prior Publication Data
US 2020/0275133 A1 Aug. 27, 2020

Related U.S. Application Data

(62) Division of application No. 15/209,051, filed on Jul. 13, 2016, now Pat. No. 10,681,391.

(51) Int. Cl.
H04N 7/025 (2006.01)
H04N 21/2187 (2011.01)
(Continued)

(52) U.S. Cl.
CPC ....... H04N 21/2187 (2013.01); G11B 27/031 (2013.01); G11B 27/28 (2013.01);
(Continued)

(58) Field of Classification Search
CPC ............. H04N 21/8456; H04N 21/812; H04N 21/42203
(Continued)

(56) References Cited

U.S. PATENT DOCUMENTS 8,826,117 B1 9/2014 Junee et al.
2008/0163283 A1 7/2008 Tan et al.
(Continued)

Primary Examiner — Jivka A Rabovianski
(74) Attorney, Agent, or Firm — James J. DeCarlo; Greenberg Traurig, LLP

(57) ABSTRACT

Disclosed are systems and methods for improving interactions with and between computers in content generating, searching, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods automatically analyze a live streaming media file, and identify portions of the media that are highlights. The content classified as a highlight can be shared across social media platforms, and indexed for searching respective to attributes of the video content. The streaming and highlight media content is renderable in a novel, modified video player that enables variable playback speeds for how content is classified, and enables on-demand selections of specific content portions and adjustable rendering displays during streaming.

20 Claims, 18 Drawing Sheets

(51) Int. Cl.
  *G11B 27/031*   (2006.01)
  *H04N 21/488*   (2011.01)
  *H04N 21/2387*  (2011.01)
  *H04N 21/8549*  (2011.01)
  *H04N 21/234*   (2011.01)
  *G11B 27/28*    (2006.01)

(52) U.S. Cl.
  CPC ... *H04N 21/2387* (2013.01); *H04N 21/23418* (2013.01); *H04N 21/4882* (2013.01); *H04N 21/8549* (2013.01)

(58) Field of Classification Search
  USPC ......................................... 725/32, 38, 44, 46
  See application file for complete search history.

(56) References Cited

U.S. PATENT DOCUMENTS

| | | | |
|---|---|---|---|
| 2012/0216121 A1 | 8/2012 | Lin et al. | |
| 2016/0381110 A1* | 12/2016 | Barnett | H04L 65/601 |
| | | | 709/231 |
| 2017/0228600 A1* | 8/2017 | Syed | G06K 9/325 |
| 2017/0257651 A1 | 9/2017 | Zhu et al. | |

* cited by examiner

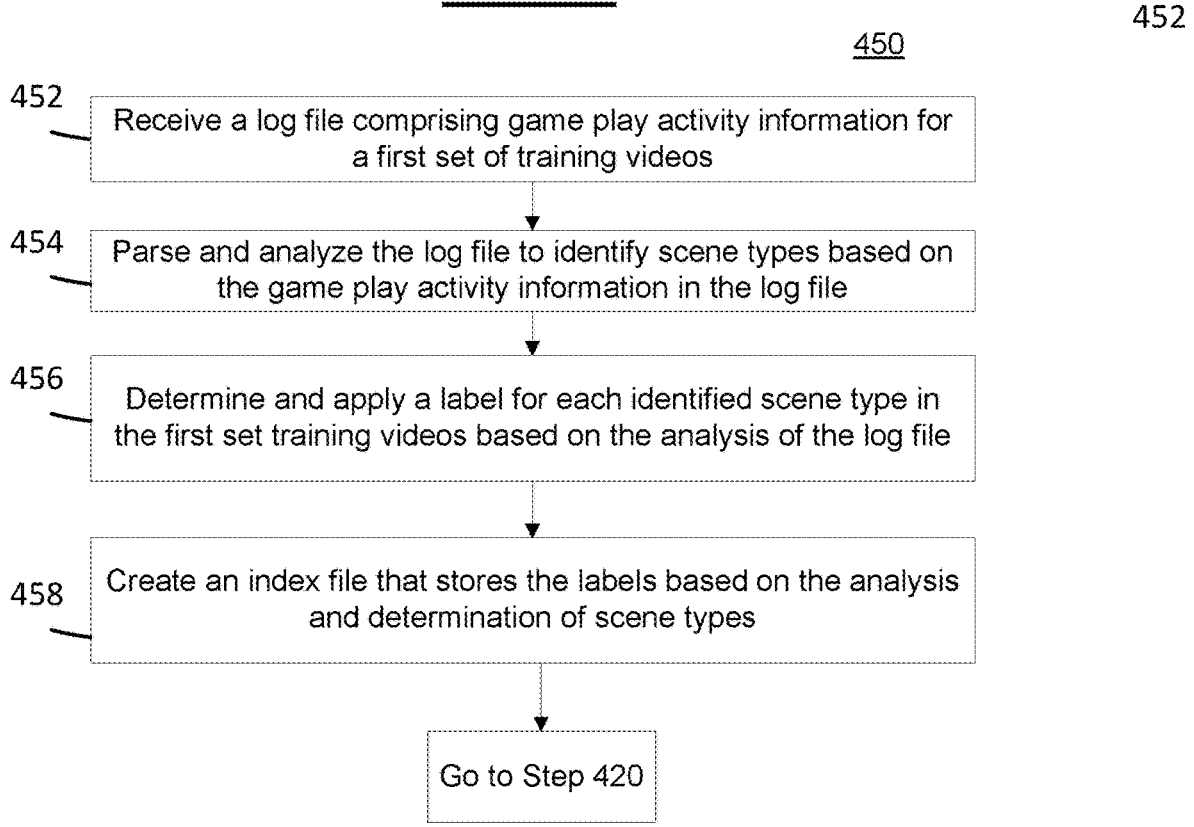

COMPUTERIZED SYSTEM AND METHOD FOR AUTOMATIC HIGHLIGHT DETECTION FROM LIVE STREAMING MEDIA AND RENDERING WITHIN A SPECIALIZED MEDIA PLAYER

This patent application claims the benefit of and is a divisional of U.S. patent application Ser. No. 15/209,051, filed on Jul. 13, 2016, titled "COMPUTERIZED SYSTEM AND METHOD FOR AUTOMATIC HIGHLIGHT DETECTION FROM LIVE STREAMING MEDIA AND RENDERING WITHIN A SPECIALIZED MEDIA PLAYER", which is incorporated by reference herein in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content generating, searching, providing, displaying, rendering and/or hosting computer systems and/or platforms by modifying the capabilities and providing non-native functionality to such systems and/or platforms. More particularly, the instant disclosure relates to automatically detecting, compiling and rendering highlight video content from live-streaming videos in real-time, where the highlight video content is automatically shareable over the internet upon detection, indexed for searching based on determined attributes of the video content, and renderable in a specialized media player that provides variable playback speeds depending on types of video content and provides display features that correspond and adapt to the type of video content being rendered.

SUMMARY

The present disclosure provides novel systems and methods for automatically, in real-time, identifying and compiling video clips during live streams of video. The disclosed system and methods, according to some embodiments, automatically analyze a live streaming media file and identify portions of the media that are considered or constitute highlights. The disclosed systems and methods leverage these automatically detected highlights to create and enhance the social and viewing experience of users by enabling the highlight content to be indexed for searching, automatically shared across networks and rendered in novel manners that provide users with the capability of focusing on the highlighted content.

Conventional systems, services, players and platforms are unable to identify and compile (or even extract) highlights (or scenes of interest) from live-streaming media because they are unable to perform the necessary computational steps in real-time (e.g., without user input) while the video is being broadcast. Current systems are only able to generate highlights of video content with human editors after a video has ended (e.g., after the stream has concluded), and they still takes a few hours to complete. Therefore, there is no current online system or mechanism for determining, outputting, displaying or sharing automatic, or "on-the-fly," segmentation of streaming media as the media arrives, or in real-time.

The present disclosure addresses these and other shortcomings in the art by providing computerized systems and methods that automatically label scenes from streaming media and score those scenes classified as a "highlight" in real-time, which can then be used to generate short-form videos of game highlights and/or summaries. As discussed in more detail below, the content classified as a highlight can be shared with other users, for example, across social media platforms, and indexed for searching respective to determined attributes of the video content. Additionally, the streaming and highlight media content is renderable in a novel, modified video player that enables adaptive splitting of video playback based on how content is classified (e.g., automatically render differing scenes of the video stream at differing playback rates based on how they were classified), and enables on-demand selections of specific content portions which can be rendered in particular, specialized displays within the player during streaming or playback.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically detecting, compiling and rendering highlight video content from streaming videos in real-time, where the highlight video content is automatically shareable over the internet upon detection, indexed for searching based on attributes of the video content, and renderable in a specialized media player that provides variable playback speeds depending on types of video content and provides display features that correspond and adapt to the type of video content being rendered.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIGS. 4A-4C are flowcharts illustrating steps performed in accordance with some embodiments of the present disclosure;

DESCRIPTION OF EMBODIMENTS

Figure 1:
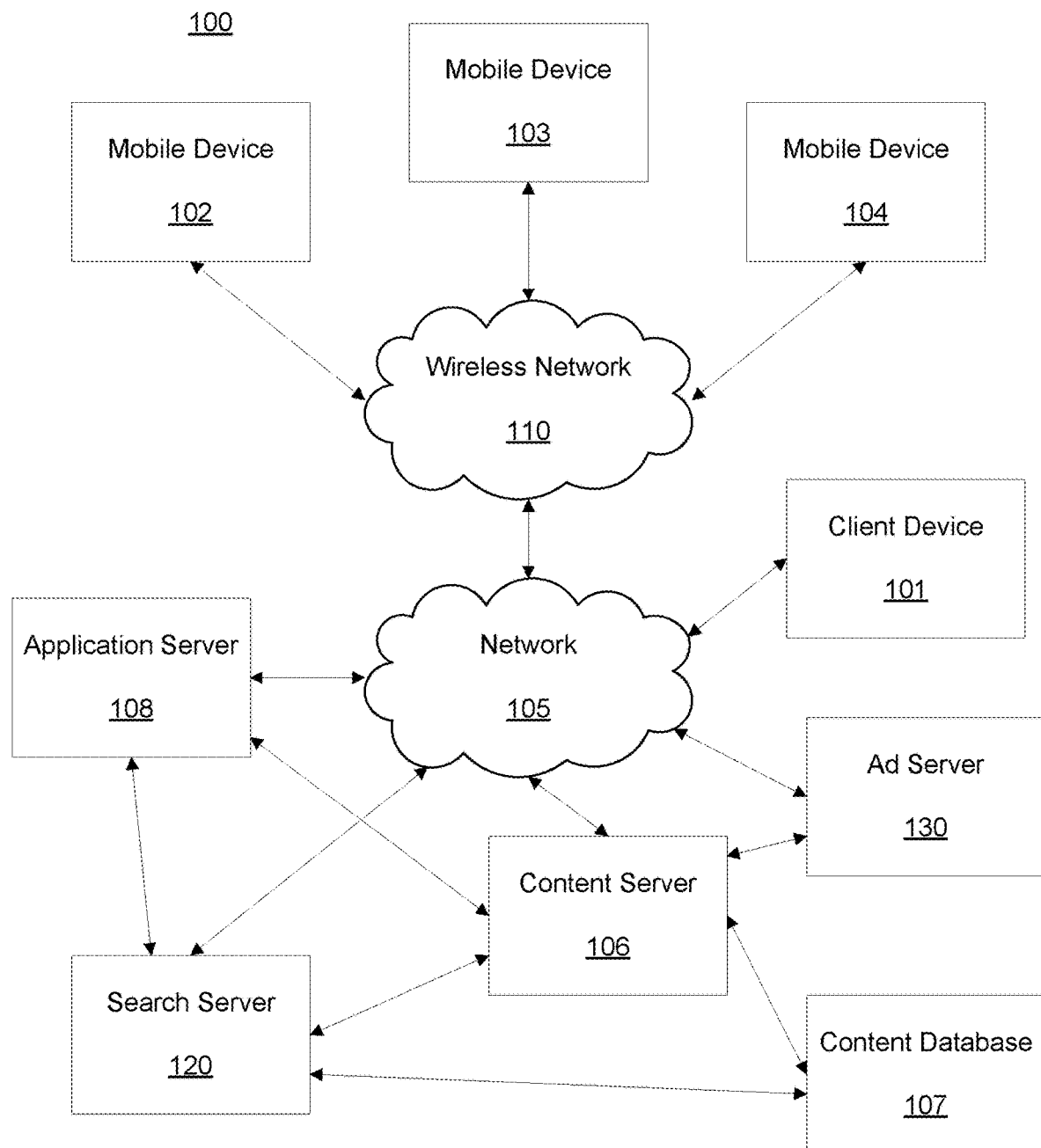
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. The present disclosure provides novel systems and methods for automatic, real-time identification and compilation (or creation) of video clips (or segments) from streaming video. According to some embodiments, the disclosed systems and methods automatically analyze a live streaming video and extrapolate from the content of the video which portions of the video are "highlights." As discussed herein, "highlights" or "highlight video content" or "highlight segments" or "highlight clips," used interchangeably, are characterized as the portions of the video that are of most interest to viewing users, such as, but not limited to, scoring plays, plays involving popular players, exciting moves, activity vital, important or deciding the outcome of the game, and the like. As discussed herein, once the highlight video portions are identified, they can be tagged, labeled or otherwise identified within the streaming media file, or can be extracted in accordance with creating a short form video clip that is renderable along with the playback of the live-stream.

According to some embodiments of the disclosed systems and methods, information corresponding to the highlight video content, and/or the live-streaming video, can be indexed and stored in a database for later retrieval. Storage of the video content can be in accordance with a variety of known or to be known parameters or attributes associated with the video content, such as, but not limited to, the quality of video, the type of scene depicted in the video, the activity occurring in the video, the identify of players, users or other objects in the video, when the scene in the video content occurred, and the like. Therefore, according to some embodiments, the streaming video content and/or the highlight portions of a finished or on-going stream can be searched in order to identify specific types or segments of content that can be immediately renderable or used in creating other types of content files.

According to some embodiments of the disclosed systems and methods, the highlight video content from a video stream can be compiled and shared with other users. Such sharing can involve any type of known or to be known data communication system or platform, such as, but not limited to, social networking, instant messaging (IM), email, SMS, MMS, and the like. The sharing of video content can be based upon determined interests of users, such that if a user has an expressed or understood interest in a particular content type (or scene), once such scene is detected as a highlight, it can be automatically communicated to such user, even if the user is not currently viewing the live-stream—for example, it can be posted to the user's Facebook® page, or on his/her Tumblr® page, or sent as a message on Twitter®.

According to some embodiments of the disclosed systems and methods, a summary highlight video can be created for a live-stream (or streams in some embodiments). That is, in some embodiments, all of the highlight segments or portions of a video stream(s) that are detected can be used to create a summary highlight video that contains only the portions of the video that are determined to be highlights. Such compilation of video portions can be performed in real-time as they are detected during playback or streaming of the live-stream. For example, if there are 3 scoring plays in a game video, the summary highlight video can be created to include only those scenes that correspond to the scoring plays. In some embodiments, creation of such video can involve analyzing the content surrounding the scoring plays so that there is additional content included in the summary highlight video which can provide the viewing user some context as to why such scenes have particular importance (e.g., identify a predetermined number of frames that precede highlight segment in order to enable the user to view the "lead-up" to the highlight scene). As above, some summary highlight videos can be compiled from multiple streams—for example, a video created from all highlights from a tournament. In some embodiments, summary highlight videos can include content associated with specific users, players or teams, or types of plays, or any other attribute or parameter that is derivable from the content of the video. In some embodiments, the summary highlight video is created in accordance with a predetermined time limit so that only the top threshold plays are included.

According to some embodiments, the disclosed systems and methods involve rendering the streaming video and highlight video segments/portions in a specialized video player. In some embodiments, the player can be associated with an application, service, browser-plug-in or content provider—for example, the disclosed player can be associated with or hosted by the eSports® platform provided by Yahoo! ®. The player discussed herein enables video content to be rendered at varying speeds such that specific portions of the video can be played back at a normal rate, while other portions are played back at an increased rate—referred to as adaptive splitting of the video content, which can occur or be applied in real-time. Such variable playback feature can be applied automatically based on identification of the type of content within the video being streamed or played back (or about to be rendered—e.g., next in the queue). For example, the content of a stream determined to be a highlight can be played at normal speeds (e.g., 1x playback rate), while the content identified as a non-highlight (e.g., content depicting a commentator speaking) can be played back at twice (2x) the normal speed. This enables the user to watch the entire stream at a faster rate while focusing on the important scenes.

In some embodiments, the disclosed media player can provide functionality that enables the automatic display of highlight video content in a pop-up display window (e.g., picture-in-a-picture (PIP)). In some embodiments, when a highlight is to be rendered or displayed, the player can automatically switch the screens (or toggle) between the main screen and the PIP screen (or window) such that the highlight content is displayed in the main screen and the non-highlight content is displayed in the PIP screen.

In some embodiments, the disclosed media player provides a status/scrubbing bar that provides indications as to the types of content within a stream. As discussed in more detail below, the status bar can display a graphic, tag, landmark or other forms of visibly displayed indicator at specific times that signifies where particular highlight content can be found. In some embodiments, such indicators can identify the entirety of the highlight content, and in some embodiments, such indicators can provide an indication as to the start, or start and stop of a highlight scene, as discussed in more detail below. This enables a user to have the improved functionally of performing high-speed scrubbing of rendered video content with reference to specific portions or times within a streaming video, which is not currently available. Currently, high-speed scrubbing enables users to manually search for content by moving the cursor to portions of a video along a status bar and then viewing the scene to determine whether it is the scene they wish to view. The disclosed systems and methods eliminates such user effort by enabling users to know that they are viewing a particular highlight scene based on the indicator(s) depicted on or within the status bar, as discussed in more detail below.

In some embodiments, the graphics, tags, landmarks or other forms of visibly displayed indicators on the status bar (such as, for example, "heat-level" indicators) can be automatically displayed on the status bar as the video is streaming. For example, if the video is playing and it is 1 hour and 10 minutes into the video and a highlight is determined to begin, when the highlight ends and the status bar has passed the ending of the highlight scene, a visual indicator can be automatically displayed on or within the status bar. This enables the user to scroll back to view the highlight again, and, as discussed above, the indicator can provide the user with an indication as to what the highlight scene depicts (what activity or type content is displayed in the highlight).

In some embodiments, as discussed in more detail below, the player can render the video in any format that is either known or to be known. For purposes of this disclosure, the discussion herein focuses on HTTP Live Streaming (also known as "HLS") for live-streaming media and MPEG-4 Part 14 (or MP4) for archived or on-demand video; however, any type of known or to be known format of video can be utilized without departing from the scope of the instant disclosure.

As understood by those of skill in the art, HLS is an HTTP-based media streaming communications protocol. HLS communications involve breaking the overall stream into a sequence of small HTTP-based file downloads, where each download loads one short portion of an overall potentially unbounded transport stream. As the stream is played, a number of different alternate streams containing the same material encoded at a variety of data rates can be selected, thereby allowing the streaming session to adapt to the available data rate (or bandwidth). At the start of the streaming session, an extended M3U playlist is downloaded to the client (or receiving device), where the playlist contains the metadata for the various sub-streams which are available.

HLS communication protocol requests use only standard HTTP transactions. HLS also specifies a standard encryption mechanism using the Advanced Encryption Standard (AES) and secure key distribution using HTTPS with either a device specific login or HTTP cookie, which together provides a Digital Rights Management (DRM) system. As usage and improvements to HLS continue, improved encryption and scrambling technologies can be implemented that provide advanced security to the content being streamed. For example, HLS communications can involve AES scrambling and base-64 encoding of the DRM content key with a 128-bit device specific key for registered commercial SWF (small web format) applications together with a sequential initialization vector (or starting variable) for each portion identified in the playlist.

HLS communication protocol, or streaming of media in HLS format, uses a web server to distribute audio-visual content and requires specific software to fit into the proper format transmission in real time. The service architecture comprises a server, distributor and a client. As discussed below, the server and distributor can take the form of any server discussed below in reference to FIG. 1 below. The client can take the form of any client, or client device discussed in reference to FIGS. 1-2 below.

As understood by those of skill in the art, the server can codify and encapsulate the input video flow in a proper format for the delivery. Then, the video is prepared for distribution by segmenting it into different files. In the process of intake, the video is coded and segmented to generate video fragments and index file (e.g., playlist). The server performs this by utilizing an encoder that codifies video files in H.264 format and audio in MP3, HE-AAC or AC-3. This is encapsulated by MPEG-2 Transport Stream to carry the coded and segmented video. The server then implements a segmenter that divides the MPEG-2 TS file into fragments of equal length, kept as .ts files. The server also creates an index file (e.g., playlist) that contains references of the fragmented files, saved as .m3u8.

The distributor utilized within the service architecture of HLS protocol can take the form of a web server—e.g., any type of server, as discussed in reference to FIG. 1, as it accepts requests from clients and delivers the resources needed for streaming. The client requests and downloads all the files and resources, assembles them so that they can be presented to the user as a continuous flow video. The client software downloads first the index file through a uniform resource locator (URL), and then the media files identified in the index file sequentially. The client further includes playback software that assembles the sequence to allow continued display to the user regardless of the variable playback data rates.

Thus, as understood by those of skill in the art, HLS communication protocol provides mechanisms to provide a scalable and adaptable streaming environment over a network, enabling, for example, high playback quality in wireless networks with high bandwidth and low quality playback on 3G networks, where the bandwidth is reduced. HLS protocol also provides protection against errors, generating alternative different video flows to use if there are any errors in a segment.

In some embodiments, HLS streams can carry generic ID3 data as a separate packet identifier (PID) in the transport stream. ID3 metadata, or PIDs, can be specified in separate audio streams for the purposes of synchronization with the video. Timed ID3 metadata in the base streams can be used to carry generic timed metadata within the stream—for example, some systems have used ID3 information to reference the time that the frame was encoded, allowing code external to the player to act in sync with the video.

HLS provides scalability that enables a video player, such as the disclosed player or even known players such as, for example, JWPlayer® or QuickTime®, to adapt to the available bandwidth of a network, where the video segments (referred to as "video flow") can be coded in different qualities. Therefore, depending on the bandwidth and transfer network speed, the video will play at different qualities. As discussed above, to implement this, the video is encoded in different qualities and an index file is generated that contains the locations of the different quality levels. When provided to the client, software executing on the client device manages the different qualities, making requests to the highest possible quality within the bandwidth of the network. Thus, HLS ensures that the video is always played at the highest possible quality—e.g., viewing lower quality on 3G networks and highest quality in Wi-Fi broadband.

As discussed in more detail below at least in relation to FIG. 15, according to some embodiments, information associated with or derived from identified and/or created highlight video segments, as discussed herein, can be used for monetization purposes and targeted advertising when providing, delivering, sharing, displaying, rendering or enabling access to the streaming media and/or created highlight video segments (e.g., on Yahoo!'s eSports® platform or player). Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., Yahoo! eSports®, YouTube®), a gaming site, an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group.

Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, game servers, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a gaming application, a streaming video application, blog, photo storage/sharing application or social networking application, can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
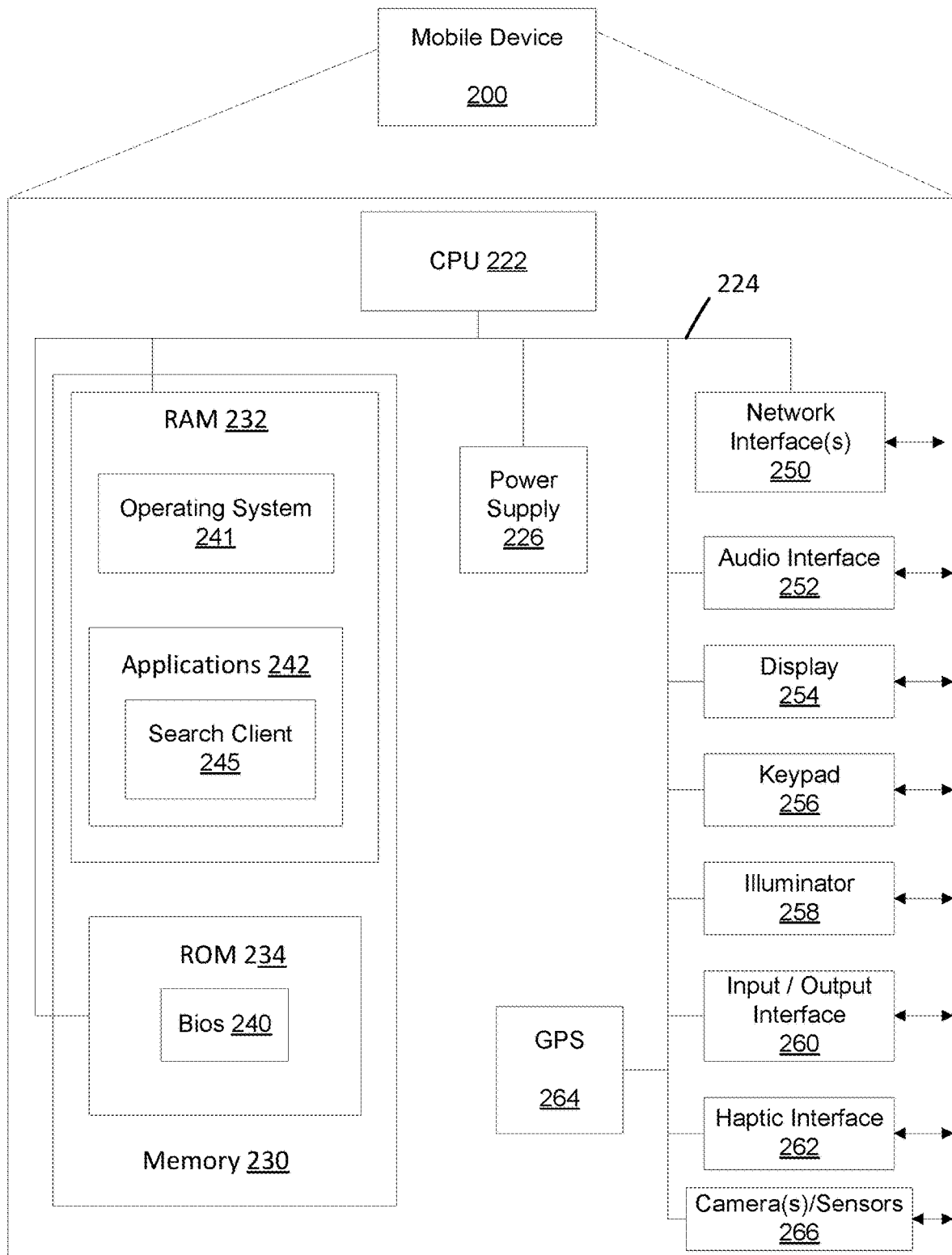
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, tri-angulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth.

Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described below.

Figure 3:
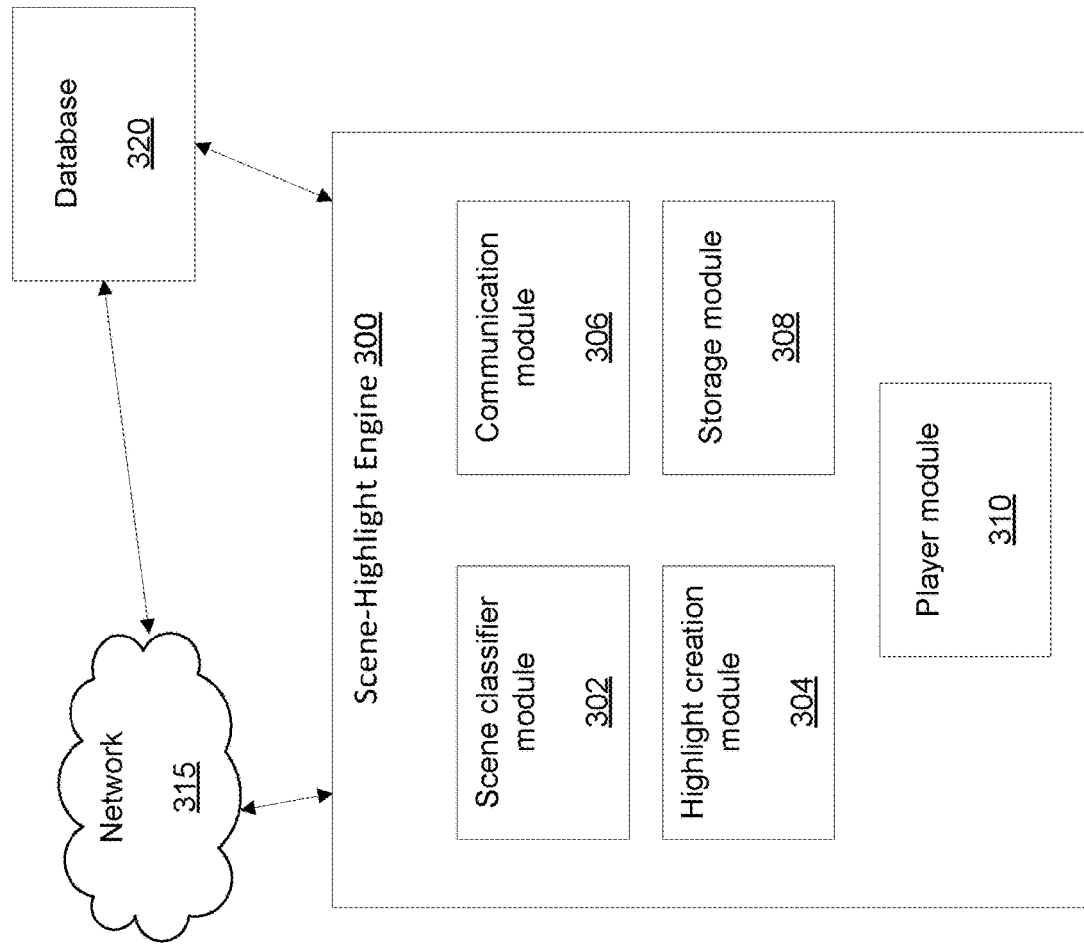
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a scene-highlight engine 300, network 315 and database 320. The scene-highlight engine 300 can be a special purpose machine or processor and could be hosted by an application server, cloud-computing server, game server, content server, social networking server, web server, search server, content provider, email service provider, ad server, user's computing device, and the like, or any combination thereof.

According to some embodiments, scene-highlight engine 300 can be embodied as a stand-alone application that executes on a user device. In some embodiments, the scene-highlight engine 300 can function as an application installed on the user's device, and in some embodiments, such application can be a web-based application accessed by the user device over a network. In some embodiments, the scene-highlight engine 300 can be installed as an augmenting script, plug-in, program or application to another media application (e.g., Yahoo! eSports®, Yahoo! Video®, Hulu®, and the like).

The database 320 can be any type of database or memory, and can be associated with a content server on a network (e.g., content server 106, search server 120 or application server 108 from FIG. 1) or a user's device (e.g., device 101-104 or device 200 from FIGS. 1-2). Database 320 comprises a dataset of data and metadata associated with local and/or network information related to users, services, applications, content (e.g., video) and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes creating, streaming, recommending, rendering and/or delivering videos, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with video content from an assortment of media and/or service providers and/or platforms (e.g., game content and/or game console or platform content/information). For example, the information can be related to, but not limited to, content type of the video, a category associated with the video, information associated with the pixels and frames of the videos, information associated with the provider of the video, information associated with the players involved in the video, information associated with the activity being depicted in the video, and any other type of known or to be known attribute or feature associated with a video file, or some combination thereof. Additionally, the video information in database 320 for each video can comprise, but is not limited to, attributes including, but not limited to, popularity of the video, quality of the video, recency of the video (when it was published, shared, edited and the like), and the like. Such factors can be derived from information provided by the user, a service provider (i.e., Yahoo!® or Tumblr®), by the content/service providers providing video content (e.g., Yahoo! eSports®, ESPN®, ABC Sports®, Netflix®, Hulu®, YouTube®), or by other third party services (e.g., rottentomatoes.com, IMDB™, Facebook®, Twitter® and the like), or some combination thereof.

According to some embodiments, as such video information is received or analyzed, it can be stored in database 320 as a n-dimensional vector (or feature vector) representation for each video and/or for each frame of the video, where the information associated with the video can be translated as a node on the n-dimensional vector. In some embodiments, as highlights are identified, detected and/or created, they can also be stored in the database 320 in a similar manner. Database 320 can store and index video information in database 320 as linked set of video data and metadata, where the data and metadata relationship can be stored as the n-dimensional vector. Such storage can be realized through any known or to be known vector or array storage, including but not limited to, a hash tree, queue, stack, VList, or any other type of known or to be known dynamic memory allocation technique or technology. While the storage discussion above involves vector analysis of streaming video and video information associated therewith, the stored video information can be analyzed, stored and indexed according to any known or to be known computational analysis technique or algorithm, such as, but not limited to, cluster analysis, data mining, Bayesian network analysis, Hidden Markov models, artificial neural network analysis, logical model and/or tree analysis, and the like.

For purposes of the present disclosure, as discussed above, videos (which are stored and located in database 320) as a whole are discussed within some embodiments; however, it should not be construed to limit the applications of the systems and methods discussed herein. That is, while reference is made throughout the instant disclosure to videos (e.g., streaming, downloadable or on-demand videos), other forms of user generated content and associated information, including for example text, audio, multimedia, RSS feed information can be used without departing from the scope of the instant application, which can thereby be communicated and/or accessed and processed by the scene-highlight engine 300 according to the systems and methods discussed herein.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the scene-highlight engine 300, and the database of stored resources 320. Indeed, as illustrated in FIG. 3, the scene-highlight engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as scene classifier module 302, highlight creation module 304, communication (or sharing) module 306, storage (or indexing) module 308 and player module 310. It should be understood that the engine(s) and modules discussed herein are non-exhaustive, as additional or fewer engines and/or modules (or sub-modules) may be applicable to the embodiments of the disclosed systems and methods. The operations, configurations and functionalities of each module, and their role within embodiments of the present disclosure will be discussed in more detail below.

As discussed in more detail below, the information processed by the scene-highlight engine 300 can be supplied to the database 320 in order to ensure that the information housed in the database 320 is up-to-date as the disclosed systems and methods leverage real-time information and/or behavior associated with the received streaming video file, as discussed in more detail below.

Figure 4A:
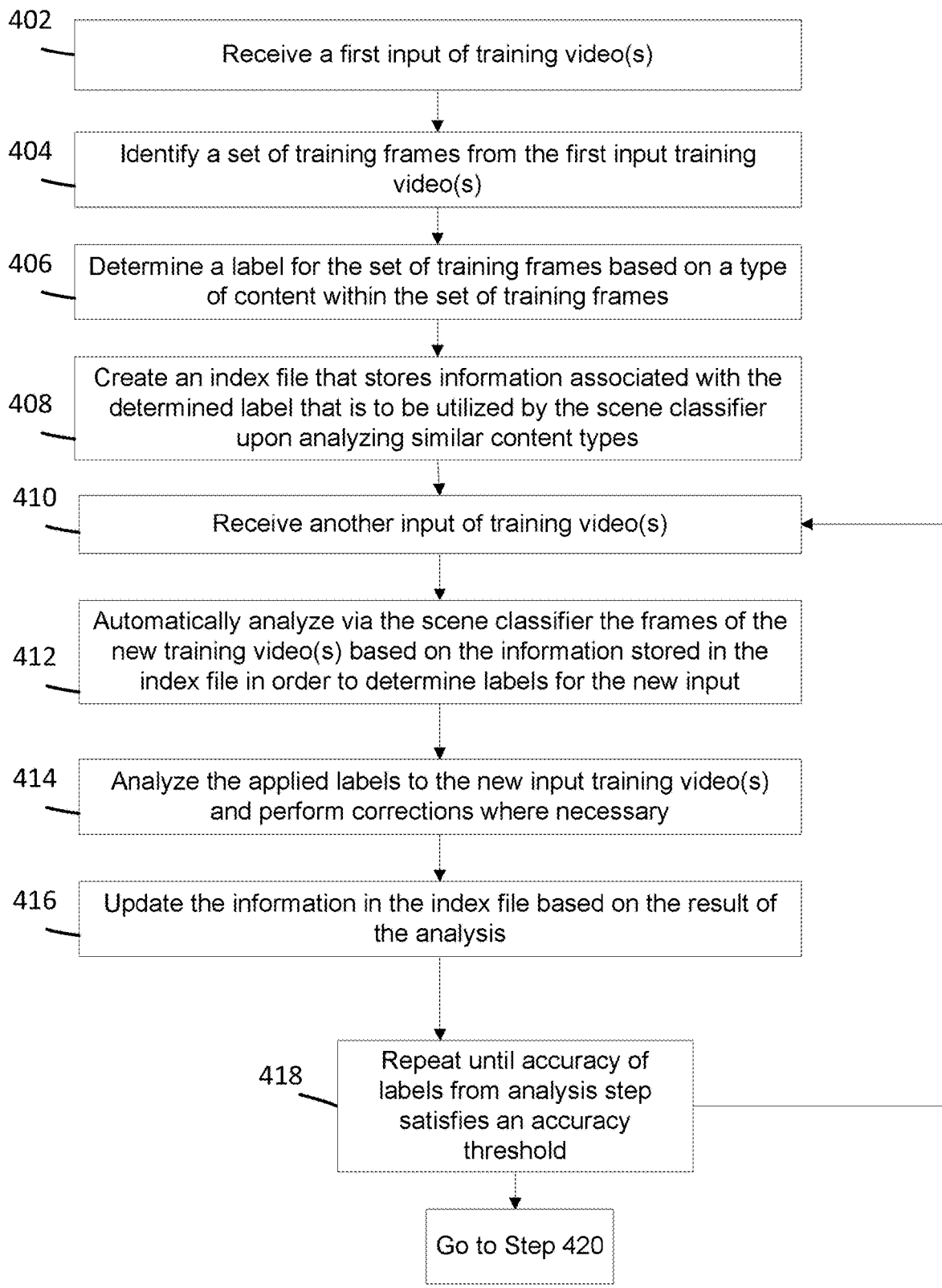
Figure 4B:
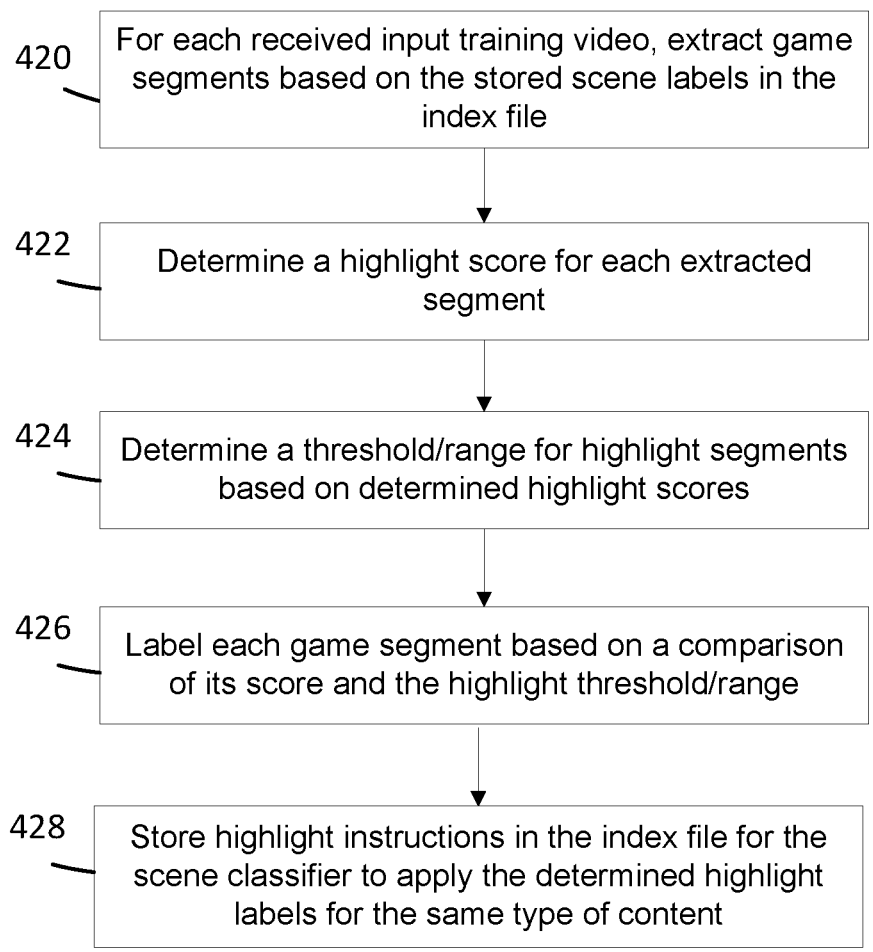
Figure 5:
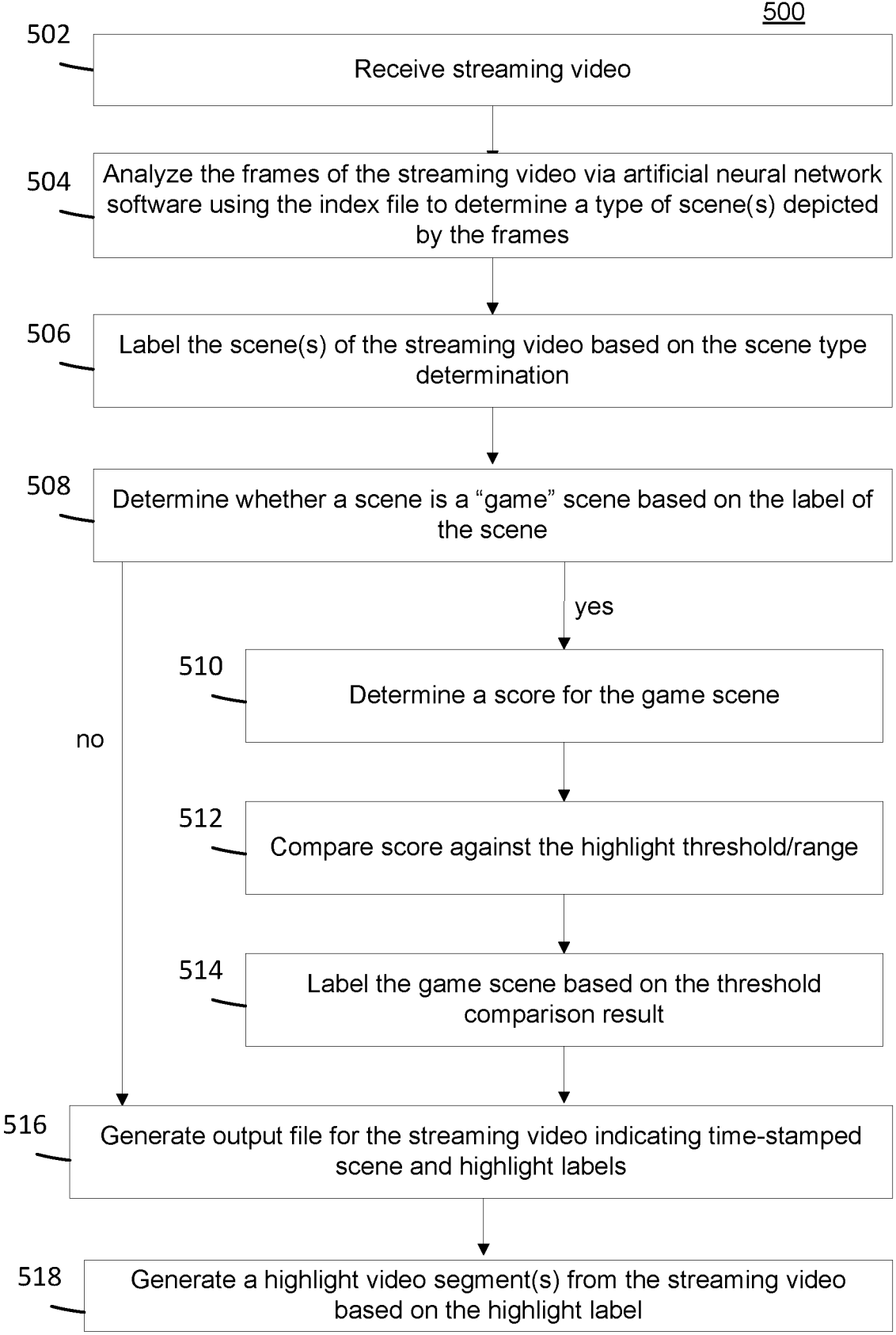
FIG. 5 is a flowchart illustrating steps performed in accordance with some embodiments of the present disclosure.

Turning to FIGS. 4A-4C and 5, the disclosed processes provide systems and methods for training a prediction model (e.g., the scene-highlight engine 300) to score highlights from classified scenes of streaming media (Process 400 of FIGS. 4A-4C) and implementing the trained model in real-time on live-streaming video in order to identify and/or create highlight video segments from the live stream (Process 500 of FIG. 5).

In order to perform the disclosed highlight detection and creation, and ultimate rendering, as discussed in more detail below, the disclosed systems and methods implement the scene-highlight engine 300 which employs novel prediction and probability modeling. As discussed herein, the scene-highlight engine 300 is trained and/or modeled based upon any known or to be known machine learning modeling technique or algorithm that leverages analyzed visual scene attributes/characteristics within a training set of video through an applied machine-in-loop video annotation system. For example, the scene-highlight engine 300 can implement a softmax function to compute the probability distribution over two classes: a highlight or non-highlight, as discussed herein. In some embodiments, the engine 300 can implement a classification and regression algorithm or technique which enables the classification of one class and the use of classified and scored video frames in order to determine a real-value for class, as discussed in more detail below. The training of the scene-highlight engine 300 enables the disclosed systems and methods to disregard certain parts (e.g., frames) from streaming video in order to focus on detecting highlights from the remaining frames of the streaming video.

The scene-highlight engine 300, through implementation of the scene classifier module 302 of FIG. 3, determines two classes (or categories or types) of scenes depicted in a video—a highlight and non-highlight. The scene classifier module 302 comprises two layers: a scene classifier layer and a highlight classifier layer. As discussed in detail below, the scene classifier module 320 has a conditional cascade modeling infrastructure based on the premise that only particular types of scenes determined by the scene classifier layer are passed on to the highlight classifier layer.

As understood by those of skill in the art, streaming media comprises distinct scenes that correspond to particular types of content. Such content types include, for example, but are not limited to, scenes where a commentator is speaking, scenes depicting game play, scenes depicting images of a game player or his/her avatar or digital likeness, scenes depicting the audience, and the like.

As discussed in detail below, the scene classifier module 302 of engine 300 analyzes incoming (and stored) frames of streaming video (or segments—e.g., segments/fragments of an HLS video file) in order to determine a type of scene being received within the stream. The scene classifier module 302 aims to discriminate game scenes (e.g., scenes that depict game play) from non-game scenes (e.g., scenes that comprise content associated with a commentator, game player, audience, and the like). The highlight classifier layer of module 302 takes as input the sequence of frames classified as a "game" scene and determines a score. According to some embodiments, the game scenes of the streaming video that satisfy a highlight threshold (or fall within a range, as discussed below) are determined to be a "highlight." As discussed in more detail below, such highlight game scenes can identified for communication to a user or broadcast to a plurality of users over the Internet, or utilized in connection in creating summary video files along with other determined highlight scenes.

According to some embodiments, the highlight threshold (or range) ensures that the game scenes comprise content associated with a distinctive set of predetermined visual parameters. Such visual parameters can include, but are not limited to, a threshold satisfying amount of activity occurring during the segment, a threshold satisfying variation of pixel attributes (e.g., a purse of bright light triggered by activity in the segment), a displayed game status (e.g., an indication that an enemy has been killed or a person has scored), an indication that a particular player or players are active or present within a particular scene, and the like.

Figure 6:
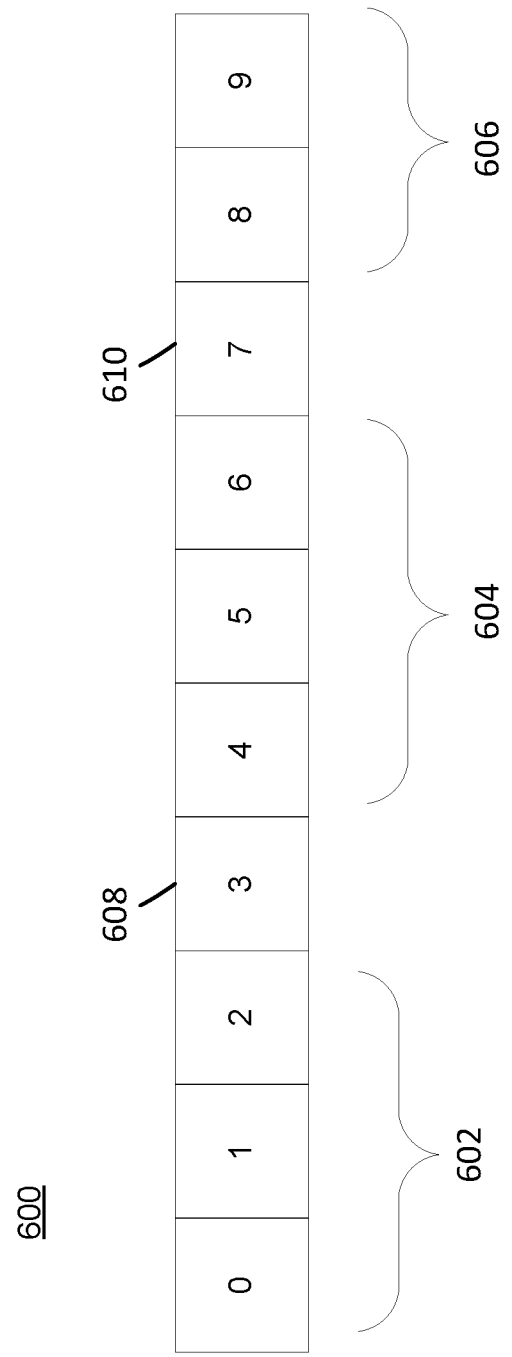
FIG. 6 is a diagram of an exemplary example of a non-limiting embodiment in accordance with some embodiments of the present disclosure.

By way of a non-limiting example, FIG. 6 illustrates a non-limiting example of some embodiments of the instant disclosure. In the example, frames 0-9 of video stream 600 are received. The stream 600 comprises 10 frames—numbered 0-9. Frames 0-2, item 602, comprise content showing a commentator welcoming the viewers to the live broadcast. Frame 3, item 608, comprises a scene transition or shot boundary within the video stream 600, such as, for example, a cut between video frames 2 and 4, fade in/out between frames 2 and 4, dissolve or wipe effect(s), and/or any other type of known or to be known effect that transitions between scenes of a video file. Frames 4-6, item 604, comprise content showing game play—for example, live streaming footage of two players playing an online game and one player "killing" the other player. Frame 7, item 610, comprises another scene transition. And, frames 8-9, item 606 comprise more content showing the commentator signing off from the broadcast.

As discussed herein, the disclosed systems and methods can analyze the incoming frames of the stream 600 in real-time in order to determine which sequence of frames (or scene) of the stream correspond to a game scene. As detailed below, as the frames of the stream 600 are received (and/or stored in memory or a database/datastore), the scene classifier layer of the scene classifier module 302 analyzes the frames to determine what type of content is being relayed by each frame or sequence of frames. If the scene classifier module 302 determines that the scene(s) is related to gameplay, then the scene(s) is passed to the highlight classifier, which scores the scene in order to determine whether the game play is an actual highlight.

As with the example of FIG. 6, items 602 and 606 correspond to scenes of the commentator speaking. Item 604 corresponds to a scene of one player scoring on the other player (e.g., "killing" the other player within the construct of the game). Therefore, according to some embodiments of the present disclosure, only scene 604 is passed to the highlight classifier layer of the scene classifier module 320 for scoring.

According to some embodiments, the scenes 602, 604 and 606 are labeled based on the analysis and determination as to whether they are a highlight or not (e.g., "non-highlight"). As discussed below, such analysis can be based on training of the scene classifier module 302, as discussed in relation to FIG. 4A, and/or, can be based on analysis of a log file associated with the stream 600, which provides activity information occurring in each frame of stream 600, as discussed in relation to FIG. 4C.

In some embodiments, such labels provide an indication as to not only the type of content depicted upon rendering of the frames of the scene, but also the length (and/or beginning and end) of the scene. In some embodiments, items 608 and 610, Frames 3 and 7 respectively, can be determined to be transition or boundary frames by the scene-highlight engine 300 implementing any known or to be known media frame analysis algorithm or scheme technique for determining differences between adjacent frames. In such embodiments, these labeled frames can serve as designators for the starting and/or stopping of particular scenes within the stream 600.

Continuing with the above example, the highlight classifier layer of the scene classifier module 320 analyzes the scene and scores the content of the scene 604. For example, as discussed in more detail below, the scene classifier module 320 can execute any known or to be known type of image or content recognition model or algorithm that can identify the depicted content of each frame of scene 604 (frames 4-6) and calculate a score for the activity occurring within, during and/or between frames 4-6. Since frames 4-6 depict one player scoring over another, for example, such activity would be result in a score satisfying the highlight threshold, therefore, scene 604 would be labeled as a "highlight."

In some embodiments, as discussed in more detail below, the identified frames corresponding to the determined "highlight" scene can be extracted, identified or otherwise utilized for creation of a short-form video clip or segment. In some embodiments, as discussed in more detail below, such creation of a highlight video segment can involve, but not limited to, generating (or creating or extracting) a highlight video segment from the frames of the stream 600 using any known or to be known frame/segment transformation technique, such as, but not limited to, imagemagick and gifsicle libraries, to name a few examples. For example, scene 604 can be transformed into a highlight video clip that is formatted as a graphics interchange format (GIF) file. Such GIF file can then be communicated to a requesting user and/or provided on an online platform that enables users to view highlights of on-going or past game play.

The disclosed systems and methods can be implemented for any type of content item or streaming media, including, but not limited to, video, audio, images, text, and/or any other type of multimedia content. While the discussion herein will focus on streaming video and identification of video frames/segments/clips within such stream, it should not be construed as limiting, as any type of content or multimedia content, whether known or to be known, or streaming or on-demand (or archived), can be utilized without departing from the scope of the instant disclosure.

Therefore, FIGS. 4A-4C depict detailed steps performed in accordance with exemplary embodiments of the present disclosure for building the cascading modeling technique that the scene-highlight engine 300 will implement upon receiving (e.g., reading) streaming media in real-time. As discussed herein, the learned predictive/probability modeling implemented by the scene-highlight engine 300 enables live-streaming videos to be analyzed, and as a result, non-game parts from video can be discarded or disregarded early in the evaluation process, which enables the computational resources of the scene-highlight engine 300 to be focused on detecting highlights from game-only scenes. This architectural set up and implementation of the scene-highlight engine 300 enables efficient, real-time processing and type detection of video in a streaming environment.

Turning to FIG. 4A, in some embodiments, the cascaded prediction model implemented by the scene-highlight engine 300 can be trained based on training data resulting in a created index file that provides, for each received video: one dataset with scene type labels and another one with highlight labels for scenes labeled for game-play.

In some embodiments, as discussed herein, the trained/learned scene-highlight engine 300 applies bootstrapping methodology that enables recursive annotations of scene types that progressively minimizes human intervention after each iteration. In some embodiments, the iterations can be performed up to the point where annotators only need to check that the annotations are correct and possibly perform minor adjustments. Once the scene type dataset is ready, the "game" sections that have been identified are extracted and delivered to the annotators to create the highlight dataset. In this regard, annotators review the game video segments/scenes and determine which segments are highlights. In some embodiments, the annotators input/feedback as to whether the scenes are highlights can be provided by the annotator pressing an arrow (e.g., up for "yes, a highlight" or down for "no, not a highlight"), or other type of input, while they watch the game scene, eliminating the need to manually label scene types.

Process 400 begins with Step 402 where a first set of input training videos are received. The set of input training videos can include a single video or a plurality of videos. Each training video comprises training frames. For example, given a set of 100 training videos, Step 402 can involve 20 of those 100 training videos (e.g., videos 1-20) being provided to the scene classifier module 302.

In Step 404, each received training video from Step 402 is analyzed and a set of training frames within each video is identified. In some embodiments, only a particular set of frames from within each received video is identified, and in some embodiments, the set of training frames includes all the frames of the received videos. In some embodiments, analysis of the frames occurring in Step 404 can occur as they are received, and in some embodiments, they can be retrieved based on the index (or playlist) file of an HLS formatted video, as discussed above.

According to some embodiments, analysis of the training video and identification of the training frame set can be performed using, or applying software defining, any known or to be known deep learning architecture or algorithm, such as, but not limited to, deep neural networks, artificial neural networks (ANNs), convolutional neural networks (CNNs), deep belief networks and the like. Implementations of such architecture and algorithms, among other types of architecture, techniques mechanisms and algorithms for decoding frames from a media stream will be discussed in more detail below, with reference in Step 504 of FIG. 5.

In Step 406, a label for each of the identified set of frames is determined. In some embodiments, such label can be determined by a human editor (referred to as an annotator). In some embodiments, an annotator will review the set of frames identified in Step 404, and based on the content depicted by each frame, a label can be assigned to that set of frames. The determined/applied label provides an indication as to the type of content depicted within the set of frames. For example, if the set of frames depicts game play, then the label will indicate that the scene depicted by the set of frames is a "game"—a game label.

In Step 408, an index file is created that stores information associated with the determined label from Step 406. The created index file can take the form of any type of file structure that relays information about a media file—for example, a text file or look-up table (LUT) file. The information in the created index file includes, but is not limited to, data and metadata associated with the content of the reviewed set of frames, and data/information relaying the applied label to the set of frames. The created index file can be stored in connection with the scene classifier module 302 (in database 320) such that when the classifier module 302 analyzes similar type of content as the content of the frames from Steps 404-406, the same label can be applied. Having an initial set of scene-type information stored as an index file, the scene classifier module 302 is viewed as having been trained (at least for an initial iteration). Therefore, in Step 410, another set of videos are received. As above, the video set received in Step 410 can include, for example, another set of 20 unlabeled videos (e.g., videos 21-40).

In Step 412, the now trained scene classifier module 302 analyzes the new set of videos which results in the automatic determination of labels for the frames of the new videos. That is, the scene classifier module 302 automatically analyzes the frames of the new set of videos in a similar manner as discussed above in relation to Steps 404-406. However, in Step 412, the frames of the new set of video are analyzed in accordance with the created index file (from Step 408). Thus, Step 412 results in the scene classifier module 302 applying labels to the scenes based on the label information in the stored index, such that the scenes that have corresponding content to those from the first input are labeled in a similar manner.

In some embodiments, such application of the labels identified in the created index file to the new training videos can be performed by the scene classifier module 302 implementing any known or to be known type of softmax function, normalized exponential or artificial neural network, among other types of known or to be known probability, classification and regression techniques and algorithms. While not disclosed to limit the instant disclosure to such embodiments, discussion of artificial neural networks for comparison and labeling of scenes of a video stream is discussed in more detail below, and such discussion would be understood by the of skill in the art to apply to the labeling occurring in FIG. 4A.

In Step 414, the automatically applied scene labels from Step 412 are reviewed and corrected if necessary. In some embodiments, Step 414 can be performed by an annotator. For example, if a label is placed in the wrong spot along the sequence of frames of a video, or incorrectly labeled (e.g., labeled as game play when the commentator is speaking), then the annotator can adjust/modify the label accordingly.

In some embodiments, since a label is already applied automatically and the annotator here is only reviewing the annotations accuracy, the playback of the video scene being reviewed can be increased (e.g., 2×, for example) since the correct labels may have already been applied (a probability that increases as more iterations of Step 410-416 are performed, as discussed below).

In Step 416, the index file stored in database 320 is updated based on the review/analysis of the annotator from Step 414. Similar to Step 408, the information related to the scene types and applied/corrected labels are to be applied to subsequently received video(s). In some embodiments, the updating of the index file (e.g., writing of new data to the stored index file) comprises updating the previously stored information with the result of Step 414. In some embodiments, Step 416 can involve creating a new index file that overwrites the previously stored index file.

As indicated in Step 418, Steps 410-416 can be performed recursively until the automatic label application and review process of Steps 412-414 satisfies an accuracy threshold. Therefore, Step 414 further involves comparing the edits/modifications of the automatically applied labels made by the annotator to an accuracy threshold, and should the comparison reveal accuracy below the accuracy threshold, Steps 410-416 are performed again. For example, if the annotator corrects the automatically learned and applied scene labels a predetermined number of times, then that fails the accuracy threshold and another set of videos must be analyzed in order to further train the scene classifier module 302 with refined information (e.g., Step 416). However, if the accuracy is at or above the accuracy threshold, then Process 400 proceeds to Step 420.

Turning to FIG. 4B, Step 420 involves extracting segments labeled with the "game" label from the training videos. Such extraction can be performed by any known or to be known extraction algorithm that enables the extraction of a portion of a video file to be extracted based on an applied label. In Step 422, a highlight score each extracted game segment is determined. In some embodiments, the highlight scores can be determined by an annotator. In some embodiments, the annotator performing the highlight score annotator is a different annotator than the scene annotator discussed above, and in some embodiments, they can be the same annotator. For example, if a game segment is depicting highlight quality content (as discussed above) at or above the highlight threshold, then the annotator can score the game segment a "1." If the game segment does not depict a highlight, then the annotator can score the game segment a "0." In another example, a highlight annotator may score game segments on a scale from 0 to 100, where scores over 75 depict a highlight.

As such, in some embodiments, based on the scores applied by the highlight annotators in Step 422, a highlight threshold/range can be determined. Step 424. For example, if the annotator scores videos on the scale of 0 to 1, as above, then a highlight range can be established for determining whether other game segments are highlights based on the whether they score a "0" or "1." In another example, from the above example of scoring game segments from 0 to 100, the score of 75 can be set as a highlight threshold, such that any game segment scored at or above 75 is labeled a highlight.

In Step 426, each extracted game segment is then labeled in relation to the established highlight threshold/range. Step 426 involves comparing the score of the segment to the highlight threshold/range, and labeling the segment accordingly, as discussed above. In Step 428, based on such labeling, highlight information is stored in the index file. In a similar manner as discussed above in relation to Steps 408 and 416, the index file enables future game segments to be labeled by the scene classifier module 320 as a highlight or non-highlight, as discussed in more detail in relation to Process 500 of FIG. 5. In some embodiments, the highlight information added to the index file comprises information indicating the score of the scene labeled as a highlight, which can be associated with the previously stored labeling information from Steps 408 and 416, as discussed above.

Turning to FIG. 4C, Process 450 details an embodiment for training the scene classifier module 302 to detect highlight scenes based on a log file. The log file (e.g., replay log), as discussed herein, includes data and metadata that provides all types of information that has occurred in a video (e.g., a streaming or played game). Such information can include, but is not limited to, the players in the game, the movements or activities of each player in the game, the time and position of each player associated with such movements or activities, the location of each user, the name of the game, the length of the game, the score of the game, and the like. The log file not only enables the scene classifier module 302 of the scene-highlight engine 300 to determine the behavior or strategy of particular players, but also enables module 302 to leverage the information in the log to identify which portions of games are highlights. In some embodiments, the log file can be for an archived game, and in some embodiments, the log file can be real-time log of a current or on-going game. Thus, instead of having to use training videos, as in FIG. 4A, scene classifier module 302 can use the information in a log file(s) to be trained, as discussed herein in reference to FIG. 4C.

In some embodiments, the log file can be in XML format, as is understood by those of skill in the art. While the discussion herein will involve the log file being in such format, as is the current normal for gaming logs tracking, monitoring and transcribing game-play activity, it should not be construed as limiting as any type of known or to be known activity log file format can be utilized herein without departing from the scope of the instant disclosure.

Process 450 of FIG. 4C begins with Step 452 where a log file associated with a first set of training videos is received. The log file can be received (or retrieved, in some embodiments) from a network location associated with a particular game provider, service provider, network platform, user, administrator, and the like, or some combination thereof. For discussion purposes, such location has associated therewith database 320 from which log file is retrieved.

As discussed above, the log file comprises game play activity information. Such game play activity information is associated with the first input of training videos. Therefore, the log file received in Step 452 provides the activity information of the training video(s) in the first input.

In Step 454, the log file is parsed and analyzed in order to identify scene types. That is, the log file is analyzed in order to find information that indicates types of game play that occurred (or is occurring) during particular time periods within the game—e.g., identify what particular type of activity is occurring at particular points during the entire duration of the game, and which players or users are performing such activity. For example, if the log file includes information about player 1, between time: 10 s-15 s ("scene 1"), performing a scoring maneuver, and from 16 s-18 s ("scene 2"), only running, then Step 458 involves the scene classifier module 302 determining that the first scene is a scoring scene and the second scene is a generic game scene. In some embodiments, the analysis of the log file involves the scene classifier module 302 running software on the log file, where the software is defined by any known or to be known type of softmax function, normalized exponential or artificial neural network, among other types of known or to be known probability, classification and regression techniques and algorithms.

In Step 456, a label is determined and applied based on the analysis occurring in Step 454. The determined labels provide an indication as to the beginning and end of particular scenes within the video(s) associated with the log file. The labels also provide an indication as to the type of scene depicted during that time frame.

In some embodiments, the labels are applied to the log file as appended data/metadata to the associated log activity. In some embodiments, the labels are applied to the training videos at the locations within the video associated with particular activity. In some embodiments, the labeled training videos can be utilized by Process 400 for training the scene classifier module 302, as the labeling occurring in Process 450 can replace Steps 402-406.

In Step 458, an index file is created and stored in a similar manner as discussed above in relation to Step 408. The created index file includes information associated with the determined labels and scene types from Steps 454-456. The created index file can take the form of any type of file structure that relays information about a media file—for example, a text file or look-up table (LUT) file. The created index file can be stored in connection with the scene classifier module 302 (in database 320) such that when the classifier module 302 analyzes similar type of content, the same label can be applied.

Process 450 proceeds to Step 420, where the scene classifier module 320 applies the learned labels from the index file created from the log file to determine where, if any, highlight content is within the training videos associated with the log files. Here, in such embodiments, Steps 420-428 of FIG. 4B are performed in the same manner as discussed above, as the only difference is that the index file being utilized is created/generated from analysis of a log file (from FIG. 4C) as opposed to a recursively defined index file (from FIG. 4A).

Turning to FIG. 5, Processes 500 details steps performed in accordance with exemplary embodiments of the present disclosure for, in a fully automated manner, detecting and rendering highlight video segments of streaming game videos in real-time. Steps 502-514 are performed by the scene classifier module 302, which is trained based on the created and stored indices from Processes 400 and 450, discussed above. Steps 516-518 are performed by the highlight creation module 304.

Process 500 begins with Step 502 where a new streaming video is received. As discussed above, the streaming video can be, for example, associated with a live broadcast of a game. Thus, Step 502 can involve, for example, a user visiting a webpage or opening an application to view a streaming event or contest in HLS video format provided by Yahoo! eSports®. It should be understood that the content of the streaming video can be associated with any type of content, and the functionality of the instant application will remain applicable.

Step 502's reception of a live-streamed video broadcast includes reading (or storing) the received video frames into memory (e.g., database 320) as each frame of the video is received. In a streaming media environment, a video is delivered as a continuous stream of short video segments (e.g., 8 seconds). According to some embodiments, Step 502's reception of the video stream involves sub-sampling the frames at a predetermined frame rate—for example, 5 frames per second. Therefore, for example, with an 8 second-long video segment there are only 40 frames to process.

In Step 504, a set of frames of the received streaming video are automatically analyzed in order to determine a scene type for the frames based on the index file (created, and discussed above, in FIGS. 4A-4C). Step 504's analysis of the frames involves accessing the stored frames of the streaming video sequentially, as dictated by the HLS index file and received .ts files, as discussed above. In some embodiments, the set of frames can include one frame at a time, a sub-set or predetermined sequence of frames within the entirety of the streaming video's frames (a portion of the stream's frames), or all of the frames of the streaming video.

In some embodiments, the frames can be read from memory either one frame at a time, and in some embodiments, the frames can be read in accordance with a predetermined short sequence of frames. In the embodiments where the frames are read one at a time, scene types can be determined based solely on the spatial layout of each frame (e.g., the order of the frames, as illustrated, for example, in FIG. 6). In embodiments where a set sequence of frames is read, scene types are determined based on the spatial layout of the video stream and the temporal layout of the video stream. In some embodiments, reading a set sequence of frames can lead to increased performance over analysis via a frame-by-frame analysis; however, an increased computational footprint may be realized. In either case, the reading of the frame set acts as the input for the scene classifier module 302, as discussed herein.

In some embodiments, the scene classifier module 302 can implement a decoder to break the stream down to individual frames, and such decoder can take the form of any known or to be known decoder architecture, technology or algorithm, including, but not limited to, a binary decoder, decompression or compression decoder, instruction decoder or video decoder, among other types of data format converters.

In some embodiments, the scene classifier module 302 can implement image recognition software to determine (or predict) a scene type. According to some embodiments, the image recognition software implemented by the scene classifier module 302 can involve any known or to be known deep learning architecture or algorithm, such as, but not limited to, deep neural networks, artificial neural networks (ANNs), convolutional neural networks (CNNs), deep belief networks and the like.

According to some embodiments, the scene classifier module 302 employs CNNs (however, it should not be construed to limit the present disclosure to only the usage of CNNs, as any known or to be known deep learning architecture or algorithm is applicable to the disclosed systems and methods discussed herein). CNNs consist of multiple layers which can include: the convolutional layer, ReLU (rectified linear unit) layer, pooling layer, dropout layer and loss layer, as understood by those of skill in the art. When used for image recognition, CNNs produce multiple tiers of deep feature collections by analyzing small portions of an input image or frame.

For purposes of this disclosure, such features/descriptors can include, but are not limited to, visual characteristics of the images characterized (or categorized and labeled) by color features, texture features, type features, edge features and/or shape features, and the like. The results of these collections are then tiled so that they overlap to obtain a better representation of the original image; which is repeated for every CNN layer. CNNs may include local or global pooling layers, which combine the outputs of feature clusters. One advantage of CNNs is the use of shared weight in convolutional layers; that is, the same filter (weights) is used for each pixel in each layer, thereby reducing required memory size and improving performance. Compared to other image classification algorithms, CNNs use relatively little pre-processing which avoids the dependence on prior-knowledge and the existence of difficult to design hand-crafted features.

It should be understood by those of skill in the art that the features/attributes (or descriptors or deep descriptors) of the video stream can include any type of information contained in, or associated therewith, image data, video data, audio data, multimedia data, metadata, or any other known or to be known content that can be associated with, derived from or comprised within the streaming video file. For example, in some embodiments, such feature data can be audio data associated with an image frame of the video stream that plays when the video is viewed.

Thus, in light of the above discussion, Step 504's analysis of the frame set of the streaming video via image recognition software, using CNN for image classification, involves the scene classifier module 302 performing a series of transformations to a frame's image in order to return a categorical label as an output based on the index file created from FIGS. 4A-4C. Such transformations can include, but are not limited to, numerical transformations of a 2D convolution for an image (or single frame), 3D convolution for a sequence of images (or set sequence of frames), average/max pooling over local regions in space and time, local response normalization, and the like. As discussed above, implementation of a CNN image classification embodiment involves multiple layers that represent an input at an increasing level of abstraction in a fine-to-coarse manner. For example, a low-level layer can represent an input image (associated with a frame) as activations to several 3×3 edge filters, while a high-level filter may represent the input image as activations to several 32×32 object-like shape filters. The CNN classification can then include a last layer that produces a categorical label. Such layer can include any type of classification technique or algorithm, such as, for example, a softmax function, which, in some embodiments, can be followed by an argmax operation.

Therefore, as a result of the analysis performed in Step 504, as detailed above, a label can be applied to each scene of the streaming video. Step 506. As discussed above, for example, such labels can involve categorizing scenes as, for example, "game," "game play," "game character selection," "game statistics," "game player," "commentator," "audience," "game statistics," and the like, or any other type of categorical summarization of a scene within a game's video stream. As discussed above, such scene label types can be initially determined from the scene classifier module 302 and are applied by the scene classifier module 302.

In some embodiments, once the scene labels for the video segments of the streaming video are determined, the scene classifier module 302 may execute temporal smoothing software in order to reduce noise of the scene type results. Such temporal smoothing software can involve performing any type of known or to be known temporal smoothing technique or algorithm including, but not limited to, additive smoothing, convolution, curve fitting, edge preserving smoothing, exponential smoothing, and the like, to name a few examples.

In Step 508, a determination is made regarding whether the labeled scenes are "game" scenes. That is, once the labels are applied to a scene or scenes of a streaming video, it is determined whether the scene depicts game play or other type of scenes that appear in the video stream (e.g., scenes depicting commentator, the audience, game statistics, or any other type of scene from a game that is not directly showing game play or activity).

If the scene is a "game" scene—it is labeled as a "game" scene from Step 506—then, Process 500 proceeds to Step 510 where a score for the game scene is determined.

In Step 510, in some embodiments, only game scenes are scored because the scene classifier module 302 is implemented to determine "highlights" of game play scenes. In some embodiments, the scoring of the game scenes is performed by the scene classifier module 302 implementing any known or to be known image recognition model, as discussed above, in order to determine a highlight score.

In a similar manner as discussed above, the frames of the scene that are labeled as "game" scenes are read from memory either in a frame-by-frame basis or as a set sequence of frames (see Step 504 above). Similar to Step 506, in some embodiments, the scene classifier module 302 implements a CNN image classification model to analyze the contents of the game scene (e.g., frame or frames of the scene); however, the difference between Step 506 and Step 510 analysis is that the last layer of the CNN model produces a real-valued scalar range that represents a highlight score (as opposed to a label). In some embodiments, for example, Step 510 can involve the softmax function of the last layer being followed by a max operation (as opposed to an argmax operation). In some embodiments, in another example, the last layer of the CNN model implemented by the scene classifier module 302 can implement a regression-type function using any known or to be known regression or regression-type technique or algorithm to produce a score for content of a game scene.

In Step 512, once the scores are determined, they are compared against the highlight threshold/range in order to determine if the game scene is a highlight. In Step 514, if the game scene's score falls within a scalar range (e.g., [0, 1]), or satisfies the highlight threshold, then the scene is labeled as a "highlight." Process 500 then proceeds to Step 516.

In some embodiments, once the highlight labels for the video segments of the streaming video labeled as game scenes are determined, the scene classifier module 302 may execute temporal smoothing software in order to reduce noise, in a similar manner as discussed above.

Turning back to Step 508, if the game scene is determined to be another type of scene—i.e., not a "game" scene—a highlight score of zero is assigned to such scene and Process 500 proceeds to Step 516.

In Step 516, an output file is generated (or created) and stored in memory (e.g., database 320). Storage of the output file is discussed in more detail below in relation to FIG. 8. The generated output file for the streaming video comprises time-stamped information associated with the determined and assigned scene labels and highlight labels. Such information can include, but is not limited to, a frame index, scene type label, scene label accuracy (or confidence), highlight score, and the like.

By way of a non-limiting example of Steps 502-516, using the video stream 600 from FIG. 6 as discussed above, an output file for stream 600 is generated that comprises the following information, as illustrated in the below table:

| Frame Index | Scene Type | Highlight Score |
| --- | --- | --- |
| 0-2 | Commentator | 0 |
| 3 | Transition | 0 |
| 4-6 | Game | 1 |
| 7 | Transition | 0 |
| 8-9 | Commentator | 0 |

It should be understood that such table is a non-limiting example of a generated output file for stream 600, and should not be construed as limiting the scope of the output file or information that can be stored in the output file.

In some embodiments, Step 516 can involve the output file including only highlight segment information for a media file. This output file comprises the information denoting where in a media stream the media associated with a game highlight can be found. In some embodiments, the output file can include an entirely new media file playlist—for example, an HLS index and corresponding segment files (or frames) for the media segments associated with game highlight segments.

According to some embodiments, Step 516 can further involve the scene classifier module 302 applying a low-pass filter to the scenes identified as highlights. Such application involves a determination as to whether two (or more) highlight scenes occur within a predetermined range to one another (e.g., 10 seconds). If they are determined to occur at or within such range, then the low-pass filter enables the scene classifier module 302 to group such scenes into a single highlight segment.

In Step 518, the game segments labeled as highlight game segments (e.g., item 604, frames 4-6 of stream 600 from the above example) can be transformed into their own independent short-form files or clips. For example, as discussed above, the highlight creation module 304 can create an animated GIF from a highlight game segment using any known or to be known frame/segment transformation technique, such as, but not limited to, imagemagick and gifsicle libraries, to name a few examples. Generation of a short-form video, as discussed herein, can include extracting the frames from memory, copying the frames from memory and/or creating new frames based on the content of the stored frames, and the like.

In some embodiments, as discussed below in relation to FIG. 11, the highlight creation module 304 can create a summary highlight video from the identified highlight frames of a stream, and communicate such video to the player module 310 for rendering.

Figure 13:
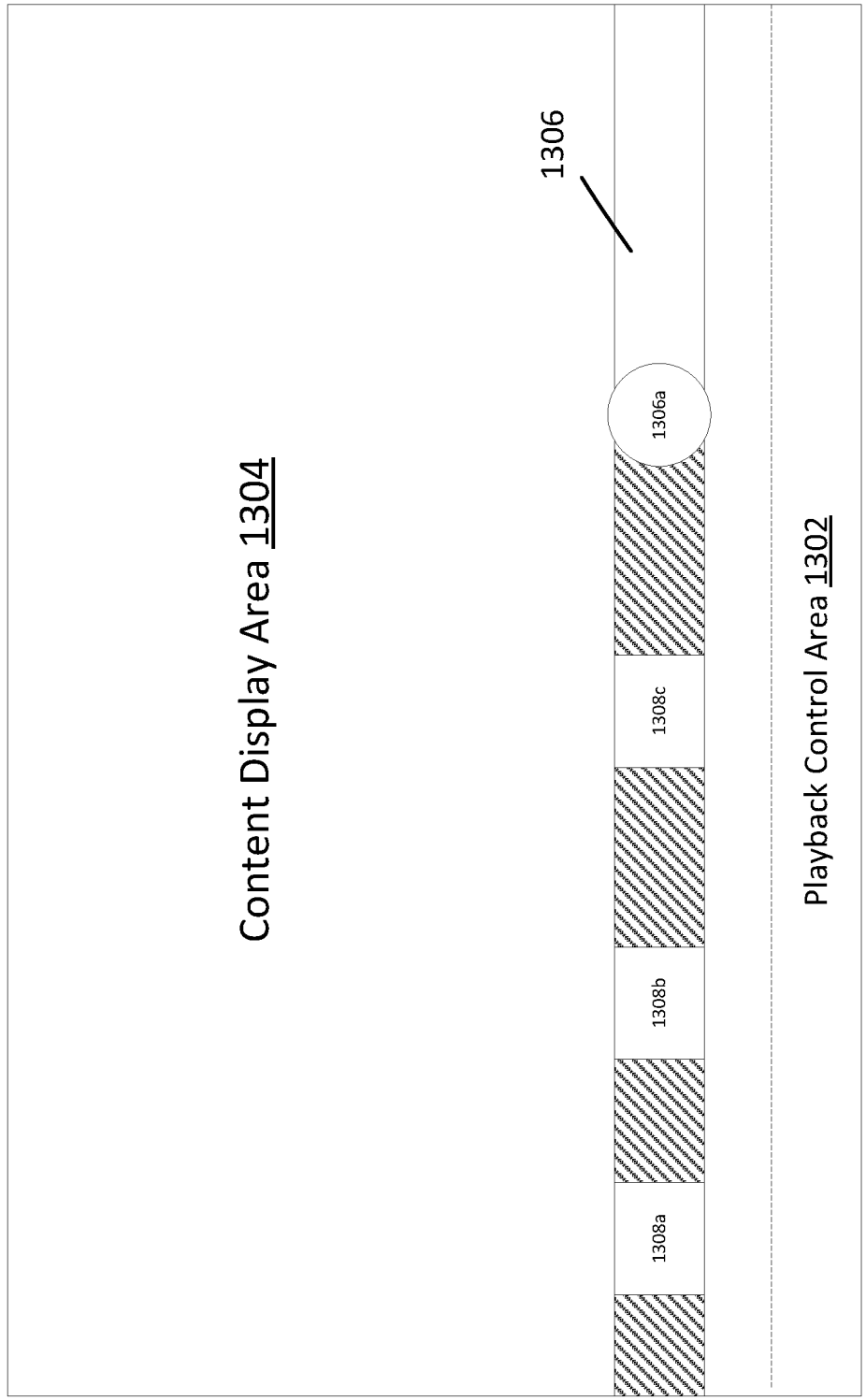
FIG. 13 is a diagram of an exemplary player user interface in accordance with some embodiments of the present disclosure.
Figure 14:
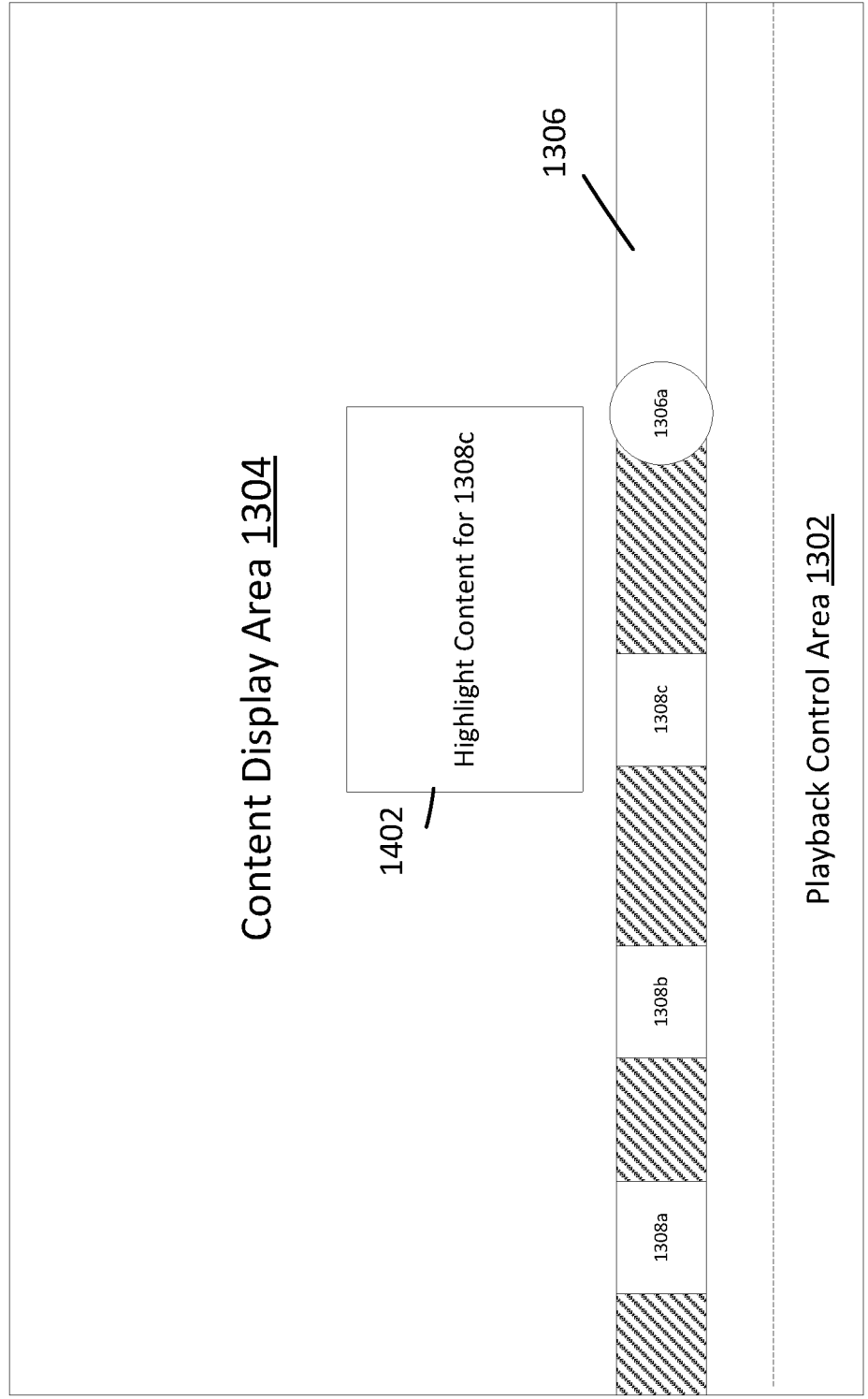
FIG. 14 is a diagram of an exemplary player user interface in accordance with some embodiments of the present disclosure.

In some embodiments, after the generation of the highlight video file is performed, the generated video file can be communicated to a user for rendering and display on a user's device within the player discussed in relation to FIGS. 13-14. In some embodiments, such communication can involve automatically rendering the highlight video segment upon display on the user's device, which is ideal for a user that has requested the highlight video segment.

As discussed in more detail below in relation to FIGS. 9-10, in some embodiments, such communication can involve automated sharing of the highlight video segment with a user. In some embodiments, such sharing can involve one user sharing the highlight video segment with another user. In some embodiments, sharing of the highlight video segment with an identified set of users can be performed automatically upon generation of the highlight video segment, where not only does a requesting user receive the highlight video segment, but also other users who follow the user, or have been identified by the user or by the system, can be provided the generated highlight video segment (e.g., reblogging the highlight video segment to a user's followers pages on Tumblr®). As will be understood by those of skill in the art, sharing a highlight video segment extracted from streaming video in this manner could result in improved user engagement in video content from which the highlight video segment was created, as well as increased activity by users on the site/platform (e.g., Yahoo! eSports®) associated with the streaming video/highlight video segment.

According to some embodiments of the present disclosure, information associated with a extracted/created highlight video segment, as discussed above in relation to Process 500, can be fed back to the scene-highlight engine 300 for modeling (or training) of the information stored in database 320 via iterative or recursive bootstrapping or aggregation functionality. This can improve the accuracy of labels and scores for video segments, as discussed above. Embodiments of the present disclosure involve the scene-highlight engine 300 applying such recursive/bootstrapping functions utilizing any known or to be known open source and/or commercial software machine learning algorithm, technique or technology.

Figure 7:
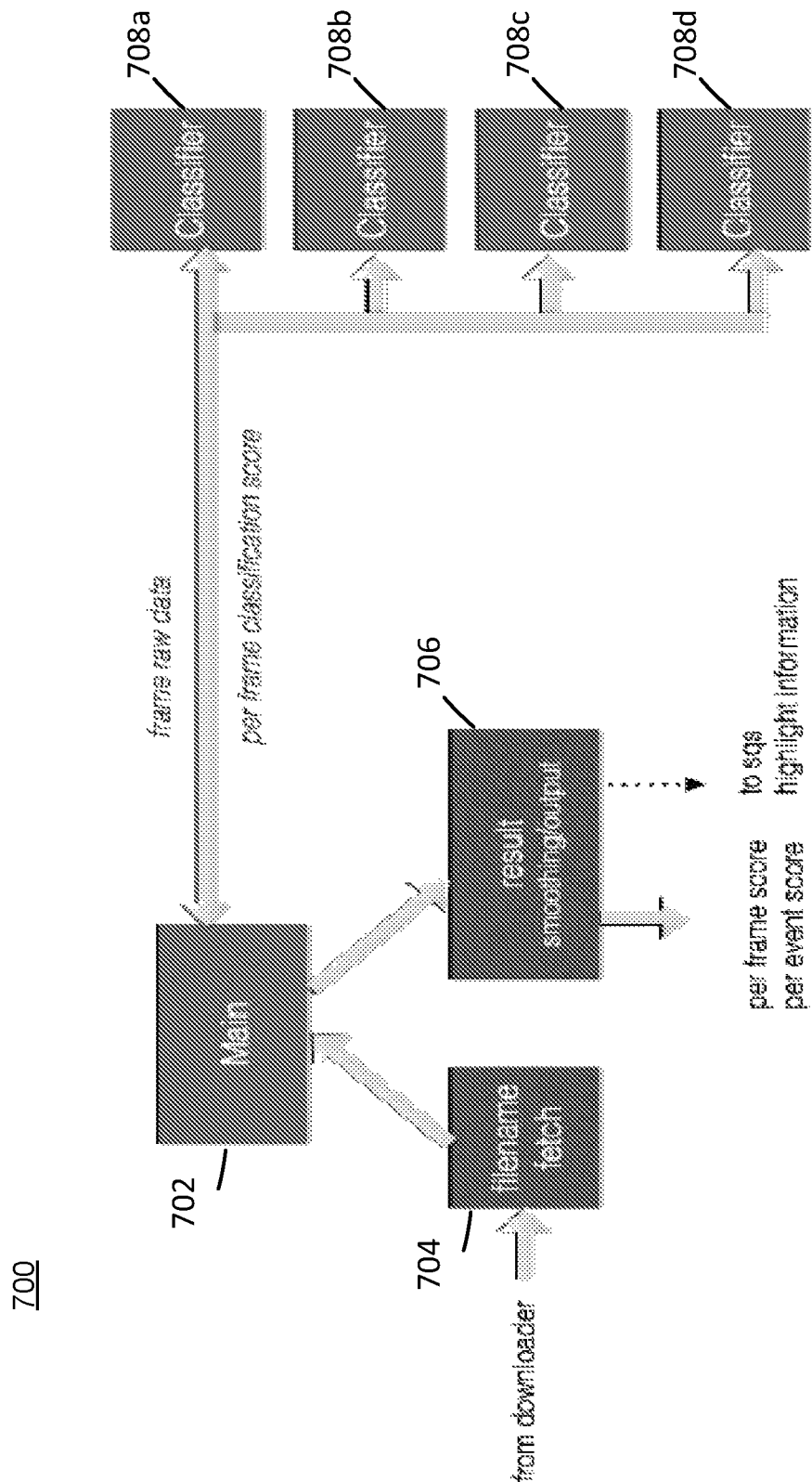
FIG. 7 is a schematic diagram illustrating an example architecture for implementing the disclosed systems and methods in accordance with some embodiments of the present disclosure.

Turning to FIG. 7, a system environment 700 is illustrated that provides exemplary embodiments of mechanisms for performing the steps discussed in relation to Process 500 of FIG. 5. As illustrated in system 700, the disclosed systems and methods can perform the classification of videos and video frames via CPU cores (items 708a-708d) implementing the steps performed by the scene classifier module 302 (as discussed above). Conventional systems typically use multiplication of data associated with frame data; however, not only is this generally inaccurate, the computation time is relatively slow. As discussed herein, using CPU cores increase video analysis speeds while producing increasingly accurate results.

As illustrated in system 700, in exemplary embodiments, 4 CPU cores are utilized—referred to as classifiers 708a-708d. In some embodiments, each core 708a-708d performs classification at a 16-bit precision value, which results in analysis of 64 frames per second (FPS). As the number of cores increases, classification speeds (FPS) increases; however, when there are too many CPU cores executing in concert, or cores executing at too high of a bit-precision (e.g., 32-bit precision), the costs become too high—therefore, the disclosed systems and methods implementation of 4 CPU cores provides an ideal balance of system performance and cost-effectiveness. It should be understood, however, that as performance of CPUs increases and costs decrease due to technological advances, the number of CPU cores can increase or decrease without altering the scope of the instant application's disclosure.

System 700 includes a main CPU or processor 702, a filename fetch processor 704, a result smoothing/output operator 706, and classifiers 708a-708d. As discussed above, HLS video content includes video files coded and segmented into fragments (e.g., .ts files) and an index file (e.g., playlist). This information is received by processor 704 via a "filename fetch" operation, as discussed above in relation to the "HLS" discussion. Therefore, from a downloader associated with the client device and/or server providing the files/file data, the processor 704 can receive the index file and subsequently the files identified in the index file—understood as streaming HLS formatted video protocol. This information is then fed to the main CPU/processor 702. The processor 702 performs frame analysis using CNN software in order to decode the received .ts files into individual frames—as discussed above in relation to Step 504. The processor 702 then compiles a batch of frames based on the number of CPU cores in system 700. For example, in system 700, there are 4 cores; therefore, the compiled batch of frames includes 4 frames. The frame batch is sent to classifiers 708a-708d such that each classifier receives a single frame from the batch.

As discussed in relation to FIG. 5, each classifier 708a-708d performs Process 500 on each frame at 16 bit-precision. A resulting frame classification score is determined for each frame by each classifier 708a-708d (as in Process 500), and is communicated back to the main processor 702. The information fed from the grouping of classifiers 708a-708d is communicated to the main processor 702 as a batch, where the amount of information mirrors the amount of information sent from main processor 702 to start the process—4 frames in an input batch results in 4 scores from the classifiers 708a-708d. This information is then fed to the result smoothing/output operator 706. The operator 706 can then perform highlight identification and generation based on the classification score, as well as smoothing, as discussed above in relation to Process 500.

Figure 8:
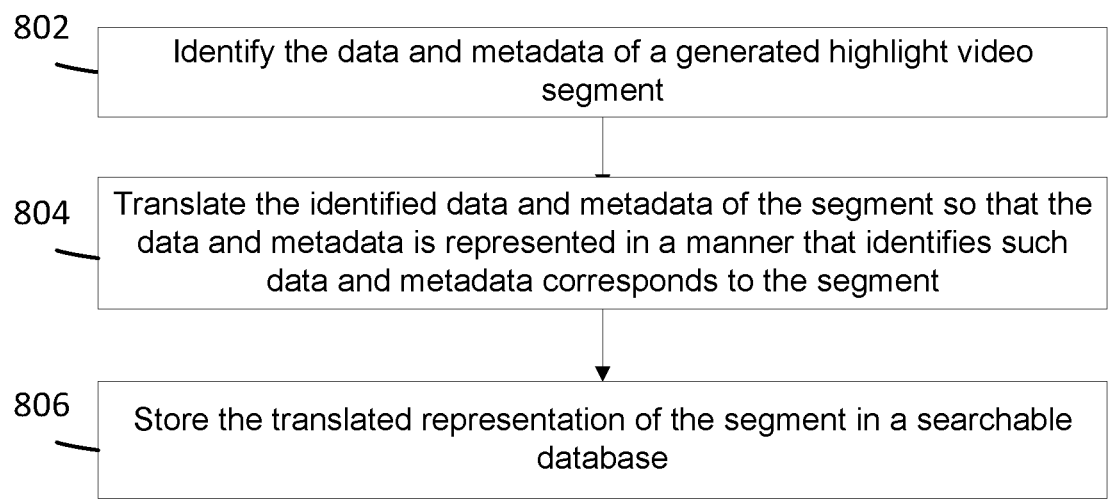
FIG. 8 is a flowchart illustrating steps performed in accordance with some embodiments of the present disclosure.

Turning to FIG. 8, Process 800 details the steps of a non-limiting embodiment performed by the storage module 308 for storing a detected highlight video segment (or clip) and the information (e.g., data and metadata) associated with the highlight video segment (identified and generated in Process 500 discussed above). As discussed herein, information associated with the highlight video content, and/or the live-streaming video, can be indexed and stored in a database (e.g., database 320) for later retrieval. Storage of the video content can be in accordance with a variety of known or to be known parameters or attributes associated with the video content, such as, but not limited to, the quality of video, the type of scene depicted in the video, the activity occurring in the video, a time when such activity occurred, the identify of players, users or other objects in the video, when the scene in the video content occurred, and the like.

Therefore, according to some embodiments, the streaming video content and/or the highlight portions of a finished or on-going stream can be searched in order to identify specific types of content that can be immediately renderable. Such rendering capabilities are discussed in relation to FIGS. 9-12 below.

Process 800 begins with the completion of Process 500, where a highlight video segment is generated. In Step 802, the data and metadata of the generated highlight video segment is identified. As discussed above, such data and metadata can include, but is not limited to, content type of the segment, a category associated with the segment, information associated with the pixels and frames of the segment, information associated with the provider of the segment, information associated with the players involved in the segment, information associated with the activity being depicted in the segment, information indicating when an activity occurs within the segment or video file, playback speed of the segment or video (at particular locations, as discussed in relation to FIG. 12 below), labels and location of applied labels within the video file, and any other type of known or to be known attribute or feature associated with a segment or video file, or some combination thereof. Additionally, the data and metadata can further include attributes including, but not limited to, popularity of the video, quality of the video, recency of the video (when it was streamed, published, shared, edited and the like), and the like. In some embodiments, such identified data and metadata can also include similar information about the streaming video from which the segment was identified.

In some embodiments, the information associated with a segment (or video) can be stored as a text file, such that the information providing a descriptive component of the video can be paired with temporal information of the segment/video, where such pairing can, in some embodiments, be stored as a key/value pair.

According to some embodiments, the data and metadata of the of the video segment can be identified via the same processes occurring above in relation to Process 500 such that the analysis as to whether the segment is a highlight can result in identification and capturing of the data and metadata of the segment. In some embodiments, identification of the data and metadata can involve parsing and analyzing the segment via any known or to be known computational analysis techniques or algorithms, such as, but not limited to, cluster analysis, data mining, Bayesian network analysis, Hidden Markov models, artificial neural network analysis, logical model and/or tree analysis, and the like.

According to some embodiments, the information associated with a frame of a video file (and segment) is stored as it is retrieved (e.g., during streaming), as discussed above. Therefore, identification of the data and metadata of a segment can involve retrieving the stored information that was stored as the segment was initially retrieved and analyzed.

In Step 804, the identified data and metadata of the segment are translated by the storage module 308 so that the data and metadata is computationally represented in a manner that identifies such data and metadata as corresponding to the segment. According to some embodiments, such video information—the data and metadata of a segment, can be stored in database 320 as an n-dimensional vector (or feature vector) representation for each frame of the video segment, where the information associated with the segment can be translated as a node on the n-dimensional vector. In some embodiments, Step 804 involves performing any type of known or to be known vector analysis on the identified data and metadata in order to generate a feature vector for the segment. Such feature vector therefore provides all types discoverable data and metadata (e.g., video information and content) associated with the segment.

In Step 806, the translated representation of the segment information is stored in database 320. Thus, in some embodiments, the created feature vector for the segment is stored in the database.

In some embodiments, the storage step of Step 806 involves database 320 storing and indexing video information in database 320 as linked set of video data and metadata, where the data and metadata relationship can be stored as the n-dimensional vector, as discussed above.

In some embodiments, storage and indexing of video information can involve storing segment data and associated metadata in a linked-list or look-up table, such that identification (from a search) of one piece of information readily leads to identification of its associated information. In some embodiments, such storage can involve storing the metadata as a separate file from that of the segment data—for example, in a time text markup language (TTML) file.

For example, as in the below table, a segment for contest "XYZ" comprises information indicating that player X scored by killing player Y at 1 hour into the contest, which led to the score of the match changing from Team A=300 to Team B=250, to Team A=400 to Teach B=250:

| Segment Data | Segment Metadata |
|---|---|
| Contest XYZ | Player X killed player Y score at 1 hour into contest Score increased 100 points for Team A |

As discussed above, the information in the table can be stored as a feature vector, as a linked list or look-up table (as shown), or as associated data files, where the "segment data" file is stored in association with a "segment metadata" TTML file. Such storage can be realized through any known or to be known vector or array storage, including but not limited to, a hash tree, queue, stack, VList, or any other type of known or to be known dynamic memory allocation technique or technology. It should be understood that the stored video information can be stored and indexed according to any known or to be known computational analysis technique or algorithm, such as, but not limited to, cluster analysis, data mining, Bayesian network analysis, Hidden Markov models, artificial neural network analysis, logical model and/or tree analysis, and the like.

Thus, as a result of such storage, generated highlight segments can be identified for a multitude of purposes, as discussed herein, ranging from identifying segments for particular players or games (or contests) for purposes of generating a summary video, to identifying segments for posting on social media, inter alia. As a result of such storage discussed in relation to FIG. 8, generated segments and their associated information can be searched and identified for rendering, either in real-time (e.g., as they are created) or at later times (e.g., for archived streams and segments).

Figure 9:
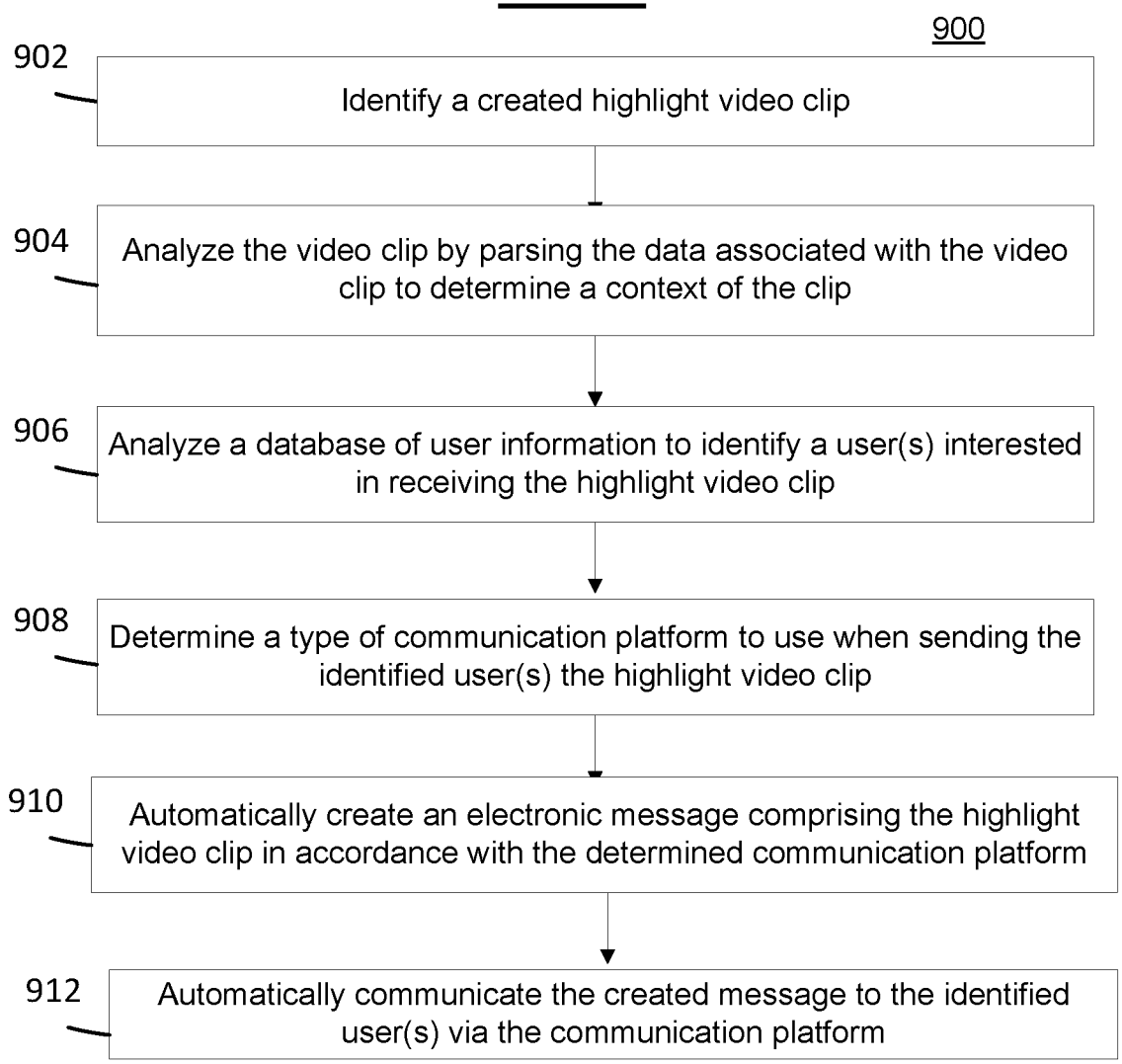
FIG. 9 is a flowchart illustrating steps performed in accordance with some embodiments of the present disclosure.

Turning to FIG. 9, Process 900 details steps performed by the scene-highlight engine 300 for identifying a created, compiled, extracted or otherwise identified highlight video clip from a streaming video and automatically communicating such highlight video clip to interested users over an electronic communication network via at least one network hosted communication platform.

By way of a non-limiting example, during streaming of a game, a highlight video clip is identified and created (via Process 500). Upon creation of the clip, a determination is made regarding the context of the video. As discussed in more detail below, such context can be based on the content in the video clip, the name of the streaming video, the data indicating the reason for which the clip was designated a highlight, and the like, or some combination thereof.

Using this determined context, a database of user information is analyzed in order to identify a user or users that are interested in viewing the clip. As discussed above, such user information can include, but is not limited to, viewing habits or patterns of users, designated favorite players or teams in users' profiles, the location of the users, gameplay behaviors of the users, preferences of the users, and the like, or some combination thereof.

For example, user X is determined to be interested in the highlight video clip because she has preset preferences that indicate she is a fan of player Y who scores during the highlight video clip. In another example, user X can be determined to be interested in the clip because she is found to typically watch the tournament the streaming video is depicting.

Once the interested users are identified, a type of communication platform is then determined, which is to be used for communicating the highlight video clip to the user. As discussed above, such communication platform types can include, but are not limited to, email, SMS, MMS, IM, social media platforms, and the like.

For example, identified user X is determined to have social media accounts: Facebook® and Twitter®. Her activity on Twitter® is substantially above that on Facebook®. Therefore, the identified communication platform in this example would be Twitter®.

Once the communication platform type is identified, an electronic message is created in accordance with the determined communication platform type. For example, the message for user X would be created in a format native to the Tumblr® platform, and the message includes the highlight video clip. Inclusion of the video clip can be through an included link to a network address of the identified clip or can be a copy of the clip. Once the message is created, it is then communicated to the user.

Figure 10:
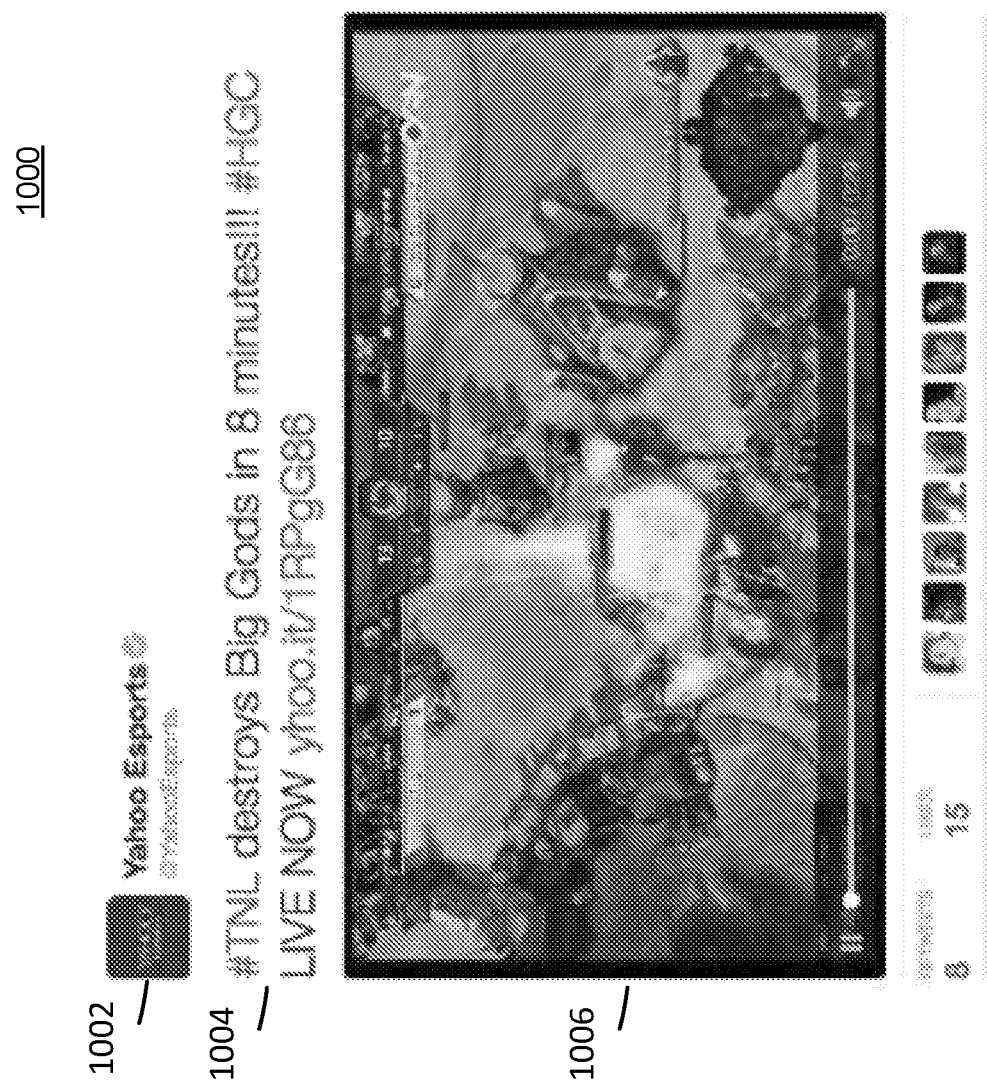
FIG. 10 is an exemplary embodiment of a non-limiting embodiment in accordance with some embodiments of the present disclosure.

By way of a non-limiting example, FIG. 10 depicts an example embodiment of a created message being delivered to user X. The example message 1000 is a Twitter® message sent by sender 1002—in this example, sender 1002 is the Yahoo! Esports Twitter® account of the eSports® streaming video platform (from which the highlight video clip was identified, as discussed above). The message 1000 includes the highlight video clip 1006 and can include text 1004. The text 1004 in this example states: "#TNL destroys Big Gods in 8 minutes!!! #HGC LIVE NOW yhoo.it/1RPgG86". The text 1004 can be created and included in the message 1004 based on the determined context of the highlight clip, as discussed above and in more detail below. Text 1004 indicates the activity that occurred in the clip, and that the streaming video from which the clip was identified/derived, is ongoing and the link at which is can be found. Upon clicking on such link, user X could be taken to the page that is streaming the video for the Big Gods game—in some embodiments, the link can take the user to the time/position in the video that starts the highlight clip, and in some embodiments, clicking the link will take the user to the live action of the stream.

Turning back to FIG. 9, Process 900 details the steps performed in the above example. In Step 902, a highlight video clip is identified. The identified clip is a product of Process 500, as discussed above. In some embodiments, upon the generation of the highlight video clip, from Step 518 of Process 500, Step 902 and Process 900 are automatically performed. In some embodiments, Step 902 can be triggered in response to a user request. In some embodiments, the highlight video clip can be identified from a plurality of stored or archived highlight video clips.

In Step 904, the identified video clip is analyzed in order to determine a context of the clip. In some embodiments, such analysis can involve parsing the data and metadata of the clip in order to determine the reasons why it was labeled a highlight (from Process 500). In some embodiments, the analysis of the video can involve, but is not limited to, performed computational analysis techniques or algorithms respective to the highlight video clip, such as, but not limited to, cluster analysis, data mining, Bayesian network analysis, Hidden Markov models, ANNs, CNNs, logical model and/or tree analysis, and the like. In some embodiments, such analysis can involve reading such data from stored information, as discussed above in relation to FIG. 8. For example, if the clip was designated as a highlight because player X killed player Y during the clip, then the context would include information indicating such activity.

After identifying the context of the video clip, a database of user information is analyzed in order to identify a user or users that would be interested in receiving information related to the identified video clip. Step 906. As discussed above, this can involve analyzing the stored user information (e.g., user data/information stored in database 320, as discussed above) via computational analysis techniques or algorithms, such as, but not limited to, cluster analysis, data mining, Bayesian network analysis, Hidden Markov models, ANNs, CNNs, logical model and/or tree analysis, and the like.

Once the user or users are identified (e.g., a set of users), a determination is made regarding which type of communication platform to utilize to communicate with the user(s). Step 908. As discussed above, this can involve analyzing the stored user information in a similar manner as discussed above in relation to Step 906 in order to determine which platform the user prefers or uses the most when communicating over the Internet. In some embodiments, Steps 906 and 908 can be performed in concert such that upon identifying a user, his/her preferred communication platform is also automatically identified in order to reduce computational steps when performing Process 900.

In Step 910, an electronic message is automatically created. The message is created in accordance with the identified communication platform from Step 908 such that the message is formatted according to the native format of such platform. In some embodiments, Step 910 can involve formatting the included highlight video segment in MPEG-4 Part 14 (or MP4) digital multimedia format such that it can be communicated over any type of determined communication platform. The formatting of the message can be performed according to any known or to be known compression and/or non-compression digital media creation and/or formatting technique, architecture or algorithm.

The message is created to include the highlight video clip (as a copy or link, as discussed above), and in some embodiments, includes text that provides the context of the video. For example, using the above example where the context is, or is based on, "player X killed player Y," then the message text can state "player X killed player Y." Another example of a created message is depicted in FIG. 10, as discussed above. In yet another example, the text of the message can provide an indication as to the score of the streaming video upon which the highlight was created, where the score can be the current score of the ongoing stream, or the score that is resultant from the activity in the highlight clip.

In Step 912, the created message is automatically communicated to the identified user via the identified communication platform. In some embodiments, the communication occurring on Step 912 can be resultant of a push notification executed by the communication module 306. If there are multiple users identified in Step 906, then the created messages are formatted according to the identified communication platform for each user, and are then communicated to them over a network via such platform.

According to some embodiments, the steps of Process 900 can be performed by any party that has access to the streaming video, whether it is the party or entity hosting the stream, the party that holds digital media rights of the stream, the party or entity creating the highlight video clip, and/or the party or entity that views or has access to the stream or video clip.

Figure 11:
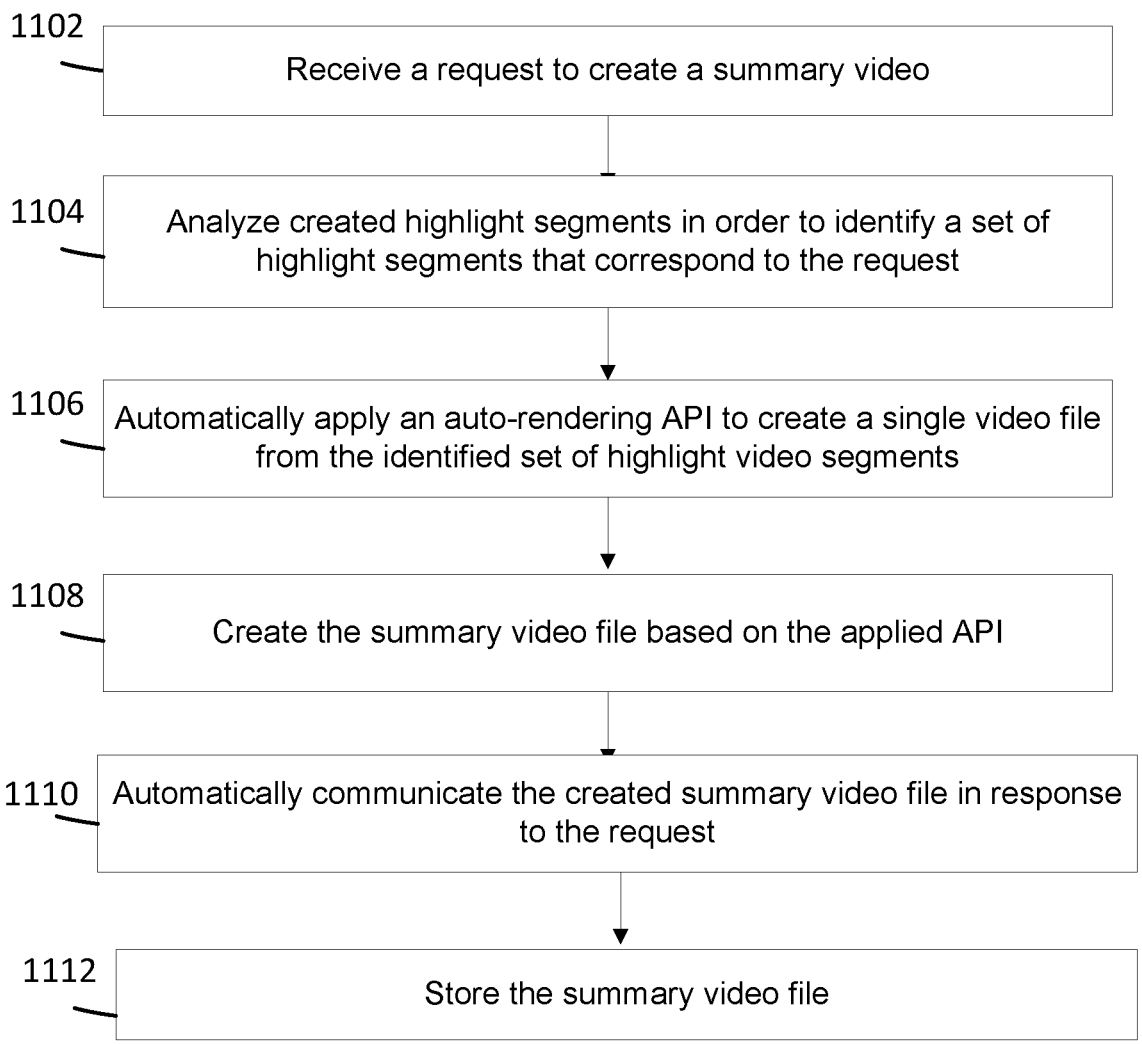
FIG. 11 is a flowchart illustrating steps performed in accordance with some embodiments of the present disclosure.

Turning to FIG. 11, Process 1100 discusses steps performed in accordance with some non-limiting embodiments of the present disclosure for generating a summary (or recap) highlight video. The steps of Process 1100 are performed by the highlight creation module 304. As discussed above, a number (e.g., some or all) of the highlight segments, portions or clips of a video stream that are detected can be used to create a summary highlight video that contains only the portions of the video that are determined to be highlights. Such compilation of video portions can be performed in real-time as they are detected during playback or streaming of the live-stream, and/or can be performed on stored or archived video streams. In some embodiments, some summary highlight videos can be compiled from multiple streams—for example, a video created from all highlights from a tournament. In some embodiments, summary highlight videos can include only content associated with specific users, or types of plays, or any other attribute or parameter that is derivable from the content of the video. In some embodiments, the summary highlight video is created in accordance with a predetermined time limit so that only the top threshold (or scored) plays are included—e.g., only the top plays that fit within the prescribed time limit.

Process 1100 begins with Step 1102 where a request for summary highlight video (referred to as a "summary video") is received. In some embodiments, the request for the summary video can be from a user, from a network platform (either one hosting the streaming video, creating a highlight clip or a third party entity, or some combination thereof), and the like, or some combination thereof. In some embodiments, the request can be iteratively sent by any of the entities above, or can be automatically generated based on completion of a particular event—for example, if a game has just completed, the request for a summary video of the game can be received. In some embodiments, the request can be based on a predetermined request period—for example, daily, such that a summary highlight is created and sent to users each day so that they are apprised of activity occurring in recent games.

The request can comprise parameters (e.g., a query) associated with any type of information that provides an indication to the highlight creation module 304 that a summary video is being requested. The request can include information associated with a particular game, tournament, player, scene or activity, and the like, or some combination thereof. For example, the request can include information requesting all scoring plays by player X from a particular tournament.

In some embodiments, the request for the summary video can also include a time limit (or predetermined length), as discussed above. This information can be used as a basis for creating the summary video such that the summary video is of the particular time duration (or length) indicated in the request. In some embodiments, the request may not require the time limit as, in some embodiments, summary videos can be created in accordance with a predetermined time limit that can be set by a user, an administrator, a network platform (either one hosting the streaming video, creating a highlight clip or a third party entity, or some combination thereof), and the like, or some combination thereof.

In Step 1104, in response to the received request, created and stored highlight segments (or clips) (from Process 500) can be searched and analyzed in order to identify a set of highlights that correspond to (or comply) with the request. The analysis occurring in Step 1104 can involve parsing the data and metadata of the created highlight video segments and identifying which segments comprise content that corresponds to the requested information.

In some embodiments, such analysis can involve computational analysis techniques or algorithms, such as, but not limited to, cluster analysis, data mining, vector analysis, Bayesian network analysis, Hidden Markov models, ANNs, CNNs, logical model and/or tree analysis, and the like. In some embodiments, such analysis can involve reading such data from stored information, as discussed above in relation to FIG. 8.

In either embodiment, Step 1104 involves analyzing stored information associated with generated highlight video segments (from Step 518 of Process 500), and identifying a set of video segments that have associated therewith information matching (at least to a threshold level) the requested information. As discussed above in relation to FIG. 8, a generated highlight video segment can be stored in database 320, and can have associated therewith information related to, but not limited to, content type of the video segment, a category associated with the video segment, information associated with the pixels and frames of the video segment, information associated with the provider of the video segment, information associated with the players involved in the video segment, information associated with the activity being depicted in the video segment, information associated with the popularity of the video segment, and any other type of known or to be known attribute or feature associated with a video segment, or some combination thereof.

By way of a non-limiting example, in accordance with Steps 1102-1106, the live-stream for a StarCraft® contest between player X and player Y has just completed. During the stream, as discussed above in relation to Process 500, a number of highlight segments are automatically detected during the real-time stream of the contest—for example 4 highlight segments. As a result, a request is received to generate a summary video for that particular contest. Based on the request, the 4 highlight segments are identified.

In another non-limiting example, if the request is for only scoring plays by player X in the contest (or from all contests or a set of particular contests), then the identified set of highlight segments will only include those segments involving player X scoring.

Continuing with Process 1100, Process 1106 involves the highlight creation module 304 automatically applying, or performing, an auto-rendering application program interface (API) that results in the creation of a single video file (i.e., the summary video) from the identified set of highlight video segments. According to some embodiments, the auto-rendering performed by the highlight creation module 304 can be any type of known or to be known API, architecture or software including, but not limited to, Open Graphics Library (OpenGL), slate templates, or software that can interact with a graphics processing unit (GPU) (e.g., the processors and CPU cores discussed above in relation to FIG. 7) in order to create and render a video file. In some embodiments, the API, architecture or software can be a cross-language, cross platform application or toolkit.

According to some embodiments, the order upon which the segments are ordered in the created video file (summary video) can be based on any attribute of the video, the highlight scores of the video and/or can be indicated in the request. For example, the segments in the summary video can be ordered according to temporal attributes of the segments such that they are sequentially ordered in the summary video based on when they occurred in the stream. In another example, the segments can be ordered such that the higher priority scoring plays (e.g., the game winning scoring play) can be ordered first, and the less impactful scoring plays rendered after (e.g., if the score of the game is 10-8, and the last scoring play resulting in the score going from 10-7 to 10-8, then that play has less impact/priority because it did not change the outcome of the game).

According to some embodiments, the applied API by the highlight creation module 304 can take into account the time limit of the summary video (as discussed above) such that the those video segments determined to be of less impact/priority to the game, or having lower highlight scores (e.g., below a score threshold) are removed so that the highlights in the summary video not only comply with the time limit, but also only provide the top scoring plays. For example, the scoring play from the above example that game the one team/player 8 points instead of 7 would not be included from the summary video.

According to some embodiments, the priority or impact of a highlight segment can be based on a variety of different factors or attributes such as, but not limited to, the number of users watching the stream when the segment occurring initially in the stream, how many users have shared, viewed or otherwise accessed the segment after it was created (or identified in the stream, as discussed in more detail below), the identity of the user(s)/player(s) or team(s) involved in the segment, whether it changed the leader/winner of the contest/game, the determined highlight score of the segment, and the like, or some combination thereof. Thus, in some embodiments, each segment identified in the set of segments (from Step 1104) can be compared to a threshold in order to determine if they are to be included in the single video file, or included in the API analysis of Step 1106.

In Step 1108, as a result of the auto-rendering API application by the highlight creation module 304 to the identified segment set (from Step 1104), the ordered segments are formatted into a single video file—referred to as the summary video file. As discussed above, the formatting of the video file can take the format of any type of known or to be known communication platform or protocol—for example, Step 1108 can involve formatting the segments (and their frames) into a HLS or MP4 digital multimedia format (in a similar manner as discussed above in relation to Step 910 of Process 900).

According to some embodiments, Step 1108 can include the auto-rendering API inserting transition slides between the segments that are being "stitched" together. The transition slides can be automatically selected from a set of transition slides that have effects including any known or to be known transitions, including, but not limited to, fade in/out, cut, dissolve, wipe, iris, or any other type of standard, commercial or artist created transitions. In some embodiments, the auto-rendering API can identify the end of one segment and the beginning of the next segment, via each segments labels (or other form of metadata), and insert a transition frame in-between such frames. According to some embodiments, insertion of the transition frames can be based on an identified template that automatically inserts selectable transitions between segments that are applied to the template.

In some embodiments, Steps 1106-1108 can further include a sub-step enabling additional input for the summary video. That is, in some embodiments, a created summary video may require or enable a commentator (e.g., a user) to provide a context or audible summary that describes or provides a recap of the summary video. In some embodiments, the commentator recap section (or frames) can be appended, added or included at the beginning of the summary video, or at the end. In some embodiments, the commentator summary/recap may take the form of an audio file that plays as the video is rendering, where it enables the commentator to describe what is happening in the video at particular sections as it is rendered. In some embodiments, the commentator summary/recap can be an associated separate file that automatically displays in an adjacent or associated window while the summary video is rendered in a video player.

In Step 1110, the created summary video file is automatically communicated to a user(s) in response to the request. According to the embodiments where the summary video is formatted as an HLS file, the creation of the video in Step 1108 can involve creating an index file that is communicated to the user(s), such that the segments of the video file are received as .ts files, as is performed within HLS protocol.

In some embodiments, the communication of the summary video, and the identification of the user(s) which receive the summary video can be determined in a similar manner as discussed above in relation to Process 900 in relation to FIGS. 9-10. Thus, the summary video can be communicated to users that are determined to be interested in the summary video. In some embodiments, such determination of users can be based on a received request (e.g., if a user submitted a request for a recap, it can be determined that he is interested in receiving the summary video).

In step 1112, the created summary video can be stored in database 320. Such storage can be performed in a similar manner as discussed above in relation to FIG. 8. For example, such storage can involve storing the video, for example, in a look-up table or as a linked list, such that that the information associated with summary video include, but is not limited to, content type of the summary video, a category associated with the summary video, information associated with the pixels and frames of the summary video, information associated with the provider of the summary video, information associated with the players involved in the summary video, information associated with the activity being depicted in the summary video, information associated with the popularity of the summary video, and any other type of known or to be known attribute or feature associated with a video segment, or some combination thereof.

Figure 12:
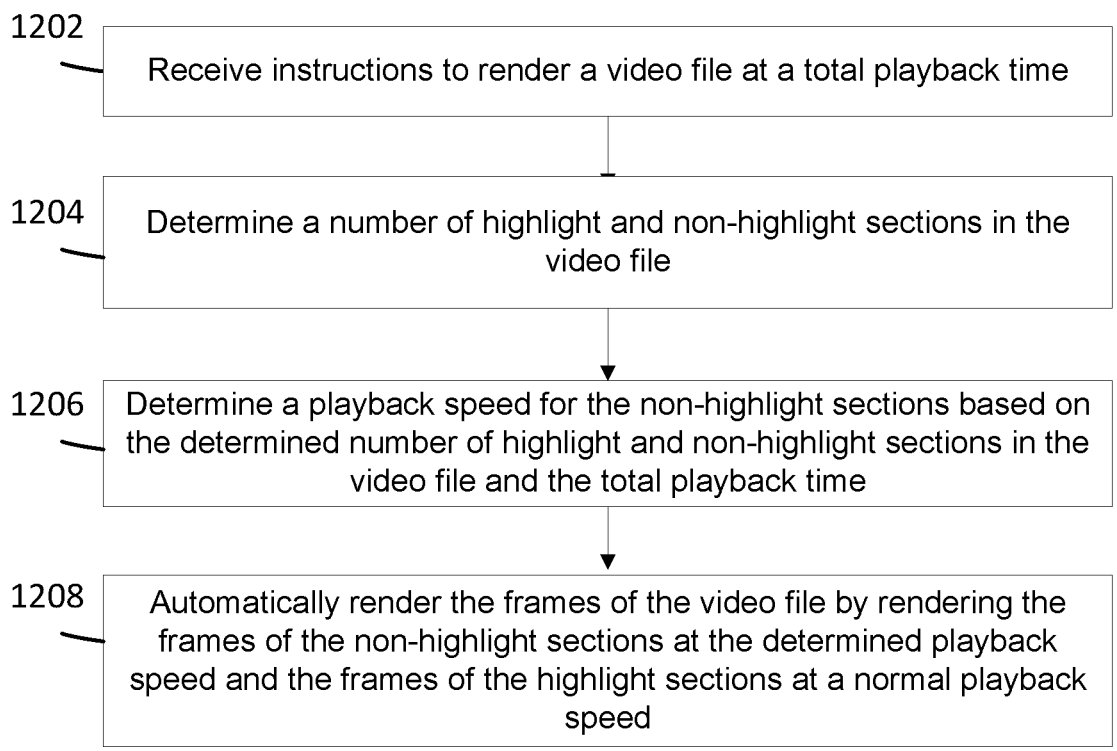
FIG. 12 is a flowchart illustrating steps performed in accordance with some embodiments of the present disclosure.

Turning to FIG. 12, Process 1200 discloses embodiments where the player module 310 can effectively perform adaptive splitting when rendering a video file. As discussed above, a video file can comprise sections of the video that are labeled as "highlights," and sections that are labeled as "non-highlights." The rendering speeds or rates of these different sections (or segments) can be automatically modified in an adaptive playback mode implemented by the player module 310.

While the discussion of Process 1200 will involve the rendering of a stored video file (or archived, or video-on-demand files (VOD) video file), it should not be construed as limiting, as the playback of a live-video can be modified in a similar manner without departing from the scope of the instant disclosure.

By way of a non-limiting example, using video stream 600 from FIG. 6 as an example, 4 sections of the stream 600 are identified as "non-highlights" (items 602, 608, 610 and 606; frames 0-2, 3, 7 and 8-9, respectively) and one section is identified as a "highlight" (item 604; frames 4-6). When the "non-highlight" sections are rendered they can be rendered at an increased playback rate, while the "highlight" section can be rendered at normal playback. This enables the user to view the entire video at a shorter viewing time. The user no-longer needs to fast-forward through non-interesting sections (e.g., non-highlights) in order to view the highlight portions of the video (e.g., the interesting parts).

By way of another non-limiting example, a 180 minute football game video has a determined 14 30-second highlight sections (using Process 500 discussed above). The highlight playback mode discussed herein provides an automatic, adaptive splitting playback experience that enables the viewer to watch the entire game in a much shorter them than 180 minutes. For example, if the highlight sections are automatically rendered at normal speeds (lx), and the non-highlight sections are automatically rendered at a 10× playback speed, the video can be viewed in its entirety in 8.7 minutes: 7 minutes (1× playback for highlight sections)+1.7 minutes (10× playback for non-highlight sections). In such playback mode, the user does not need to "touch the remote" or move his/her mouse to speed up playback by skipping sections to see the entire game, as it removes the manual effort it takes to watch an entire game while providing the user the capability to focus only on the best parts (e.g., the highlight sections).

Process 1200 begins with Step 1202 where instructions are received for rendering the video file. The instructions include information indicating a total time for viewing the video from start to finish. Using the above example, Step 1202 can include receiving instructions for viewing the football game in 10 minutes. As discussed herein, the player module 310 can analyze the video file for the game and determine that the non-highlight video sections should be rendered at 10× speeds so that the video is less than 10 minutes (and rendering at 11× speeds would place the playback time at longer than 10 minutes).

In some embodiments, the instructions received in Step 1202 can be included as part of a request for the video file, where, as discussed above, upon identifying the video file from database 320 (e.g., a stored version or cached version/portion of the video file), Process 1200 turns to Step 1204. In some embodiments, the instructions can be received from a user, an administrator, a system, a content provider or the like, or some combination thereof.

In Step 1204, the identified video file is analyzed in order to determine the number of highlight sections (or scenes) and non-highlight sections. In some embodiments, such analysis can involve identifying the labels associated with the video file stored in database 320 in order to determine where and how many sections are highlights and non-highlights. In some embodiments, the identified video file can be analyzed via computational analysis techniques or algorithms, such as, but not limited to, cluster analysis, data mining, Bayesian network analysis, Hidden Markov models, ANNs, CNNs, logical model and/or tree analysis, and the like, in order to identify the number of highlights and non-highlight sections in the stored video file. In some embodiments, Step 1204 can involve performing Process 500 on the game in order to determine the section types, as discussed above.

In Step 1206, a playback speed for the non-highlight sections is determined based on the determination in Step 1204 and the total playback time. For example, using the above example, given that there are 173 minutes of non-highlights (and 14 30 second highlight sections), and the total playback time is to be at most 10 minutes, then the playback speed of the non-highlight sections is determined to be at 10 times the normal playback speed. In some embodiments, Step 1206 can further determine a playback speed for non-highlight sections based on highlight sections being determined or set (as per instructions by the player, user, administrator, content owner or provider, and the like) to be played back in slow-motion (or at a slower rate—e.g., ½×). In some embodiments, a determination is made regarding the highlight sections playback speed. Such determinations can be based on a type of highlight section (e.g., whether it is a scoring play, or associated with a particular player, or a section having a score satisfying a score threshold indicating a particular importance, for example). Upon such determination, the highlight section can be determined to be played back at a reduced speed (e.g., ½×, or ⅓× rate), and the non-highlight sections are therefore determined accordingly, as discussed above.

In some embodiments, the determination of the playback speed occurring in Step 1206 can involve the player module 310 implementing any known or to be known curve fitting, smoothing, linear and/or non-linear architecture, software or technique, such that the that determined playback rates for the video file are determined to fit within the total time playback time.

In Step 1208, the video file is automatically rendered so that the frames of non-highlight sections are rendered at the determined playback speed from Step 1206 and the frames of the highlight sections are rendered at a normal playback speed (e.g., 1×). The rendering in Step 1208 involves the player module 310 automatically adjusting the playback speed of the video file based on the labeled beginnings and endings of the highlight and non-highlight sections. Such modification can be based on the player module 310 monitoring the frames being rendered and performing a detection as to whether there is an indication (in the data or metadata of the video file) that the frame being or about to be rendered is a highlight or non-highlight—in some embodiments, such indication can be provided by tags or labels applied, stored or associated with the frames of the video file, as discussed above.

According to some embodiments, while the player module 310 is rendering the video file, the player module 310 can implement any known or to be known pitch shifting or audio-timescale architecture, technique or algorithm that ensures the audio matches up with its corresponding video.

FIGS. 13-14 illustrate embodiments of a user interface (UI) for the novel, specialized video (or media) player, UIs 1300 and 1400, respectively, which provide non-limiting embodiments of how the disclosed video player can render media content files.

As discussed herein, UIs 1300 and 1400 illustrate the interface and capabilities for the disclosed specialized video player, as implemented by the player module 310. In some embodiments, the player can be associated with an application (e.g., a mobile application, cloud or web-based application, or HTML5 application, for example), web browser, an operating system, browser plug-in, a service or content provider—for example, the disclosed player can be associated with or hosted by the eSports® platform provided by Yahoo!®.

As discussed in the instant application, the player UI depicted in FIGS. 13 and 14 is associated with the media player mentioned above that is used for rendering live-streaming media, as well as highlight clips (e.g., short form videos) and summary videos. According to some embodiments, the player can be embodied with codecs for rendering different media file types. One type of the codec is an HLS codec used for reading, retrieving, downloading, streaming and rendering HLS video files. Another codec is an MP4 coded used for reading, retrieving, downloading, streaming and rendering MP4 video files. According to embodiments of the instant disclosure, the player module 310 uses the HLS codec to render live-streaming media as it is typically communicated, or streamed, in HLS format. In some embodiments, stored or archived video (e.g., VOD) are rendered by the player module 310 using the MP4 format.

While the discussion herein will focus on HLS video formats—that is, live-streaming media—it should not be construed as limiting, as embodiments of rendering VOD files are performed in a similar manner without departing from the scope of the instant disclosure. Additionally, while the discussion above only mentions the HLS and MP4 codecs, it should not be construed as limiting, as any type of known or to be known codec, whether software based or embodied as a device, can be used for encoding and decoding digital data streams.

Turning to FIG. 13, UI 1300 depicts an example non-limiting embodiment of a player UI, as executed by the player module 310. The UI 1300 displays a playback control area 1302, which can include, but is not limited to, a play button, rewind button, fast forward button, pause button, stop button, share button, volume button, settings button, maximize/minimize button, a time indicator (e.g., current and overall time of the video) and the like. In some embodiments, the playback control area 1302 can be displayed as a transparent area where only the controls are visible when that area is interacted with—e.g., when a user hovers their mouse pointer over such area, or provides some other form of interaction with such area (e.g., a touch input)—as indicated by the dashed line.

The UI 1300 also displays a content display area 1304 for displaying content of a rendered video. As discussed above, such content displayed in the content display area 1304 can include, but is not limited to, digital video content, text (associated with, for example, scores, indicators regarding activity occurring or having occurred in the video content, messages, digital advertisements, and the like), digital advertisements, and/or other forms of graphics or digital media that provide indications as to what is occurring in the game play (e.g., the names of the teams or players), and the like.

The UI 1300 further displays a status (scrubbing) bar 1306. The status bar 1306 provides indications as to the determined types of content within a stream as well as an indication as to the current status of the stream—e.g., how much time has elapsed in the streaming of the video. That is, the status bar 1306 provides an icon (or displayed interface object) 1306*a* that resides in the current position of streaming—e.g., icon 1306*a* moves along the status bar 1306 and provides an indication of where within the overall playback of the video is the current playback as playback occurs. For example, as indicated in UI 1300, the shaded region to the left of icon 1306*a* provides an indication as the progress of the video (e.g., what has already been rendered or streamed), and the un-shaded region to the right of icon 1306*a* provides an indication as to the remaining time left in the video. In some embodiments, the status bar 1306 can be located in the playback control area 1302. In some embodiments, the status bar 1306 can provide a time indicator (e.g., current and overall time of the video).

The UI 1300 displays information objects (referred to as tags, graphics, icons, landmarks, or other forms of displayed interface objects) that provide indications where in the streaming video highlight segments have been detected—from Process 500, as discussed above. The information objects (or tags, as discussed above) are identified by items 1308*a*-1308*c* and they are situated within or on the status bar 1306 at specific times or portions where highlight content can be found. In some embodiments, displayed tags 1308*a*-1308*c* can correspond to the entirety of detected highlight sections; in some embodiments, tags can be automatically placed at the beginning and end of a detected highlight, or just at the beginning. In some embodiments, the tags may not need to take the form of an actual tag or icon, as they can be implemented on the status bar through alterations in the coloring or shading of the status bar. For example, if a section of video is determined to be a highlight, the area of the status bar associated with that section can be modified to be darker or a different color, which provides an indication to the user that the area is associated with a highlight portion of the video. In some embodiments, the tags 1308a-1308c can provide an indication as to what type of content is displayed at that particular location—e.g., such indication can be based on displayable keywords, applied colors or patterns to the status bar 1306, or via windows displayed upon clicking on or interacting with a tag that provides a clip preview of the scene (e.g., as displayed in window 1402, discussed below).

In some embodiments, the graphics, tags or other forms of visibly displayed indicators on the status bar can be automatically displayed on the status bar immediately upon detection of a highlight as the video is streaming. For example, if a video is playing and it is 15 seconds into the video and a highlight is determined to begin, when the highlight ends 10 seconds later (e.g., at 25 seconds) (as detected from Process 500 discussed above), as the icon 1306a on the status bar 1306 passes the ending of the highlight scene and moves to 26 seconds into the video, a graphic/tag can be automatically generated displayed on the status bar (as a result of the highlight detection). As above, the graphic/tag can indicate the entire 10 second span of the highlight, can provide an indicator as to the start of the highlight (e.g., at the 15 second marker), or can provide indicators as to the start and stop of the highlight (e.g., at 15 seconds and 25 seconds, respectively). This enables a user to precisely scroll back to view the highlight again, and visibly see where highlights are in the video should he/she want to view them at a later time.

It should be understood that UI 1300 is an example of a streaming video being displayed, and the number of tags, three tags—1308a-1308c, is simply an example as there can be any number highlight segments detected.

As discussed above, the content display area 1304 can display content at such current location (e.g., the content associated with the location of the icon 1306a); and in some embodiments, the display area 1304 can display content associated with the highlight segments, items 1308a-1308c. For example, the content display area 1304 is current displaying video content associated with the icon 1306a's position. However, the user is late to the viewing and wants to see the latest scoring play. She clicks on the tag 1308c, and as a result, the content display area 1304 begins rendering the highlight content associated with tag 1308c from the beginning. In some embodiments, upon completion of the rendering of such highlight, the content display area 1304 can automatically revert back to the real-time rendering of the video. In some embodiments, the rendering continues from the point after the ending of the highlight.

In some embodiments, the player associated with UI 1300 enables video content to be rendered at varying speeds, as discussed above in relation to FIG. 12. For example, the playback of the video can be played back at 10× (as from the above example discussed in relation to FIG. 12), whereas the playback of the video sections associated with tags 1308a, 1308b and 1308c is at a rate of 1× (or normal speed).

In some embodiments, the player associated with UI 1300 enables video content to be rendered such that only highlight video content is rendered. For example, upon entering a play command or instructions (or the player receiving a play instruction), the player could render just the segments associated with highlight content—e.g., content associated with tagged sections 1308a-1308c.

Turning to FIG. 14, player UI 1400 depicts the same content and capabilities as UI 1300. Player UI 1400 provides non-limiting embodiments where the media player can provide functionality that enables the automatic display of highlight video content in a pop-up display window 1402 (e.g., picture-in-a-picture (PIP)). The PIP window is draggable and adjustable, and is fully interactive enabling user actions respective to the content in the PIP window 1402. As displayed, the PIP window 1402 appears respective to the displayed highlight content it is depicting (or the section that triggered the display of the PIP window 1402). For example, as illustrated in FIG. 14, the PIP window 1402 is displayed respective to (e.g., adjacent) tagged section 1308c because it is displaying content associated with that section. In some embodiments, the PIP window 1402 can be overlaid on-top of the UI 1400, or can be displayed as an integrated window within the UI 1400.

In some embodiments, when a highlight is to be displayed, the player module 310 controlling the UI 1400 can automatically switch the window (or toggle) between the content display area 1304 and the PIP window 1406 such that the highlight content (associated with tags 1308a, 1308b or 1308c) is displayed in the display area 1304, and the non-highlight content or current real-time streaming video content is displayed in the PIP window 1406.

For example, the content display area 1304 is current displaying video content associated with the icon 1306a's position. However, the user is late to the viewing and wants to see the latest scoring play. She clicks on the tag 1308c, and as a result, the PIP window 1402 is displayed. In some embodiments, the PIP window 1402 automatically begins rendering the highlight content associated with tag 1308c from the beginning while the content display area 1304 continues rendering the live-stream of the content. In some embodiments, the UI 1400 toggles the display between the PIP window 1402 and content display area 1304 such that the PIP window 1402 displays the content of the live-stream, while the content display area 1304 displays the highlight content of the selected tag. In some embodiments, once rendering of the highlight is completed, the PIP window 1402 can be automatically closed, and if the display was toggled, the rendering/display of the live-feed switched back to the content display area 1304.

In some embodiments, the audio of the highlight stream controls such that when a highlight video is being rendered, regardless of whether it is displayed in area 1304 or window 1402, the audio of the highlight is played and the audio of the live feed is silenced (at least until the highlight content has completed rendering).

In some embodiments, once the highlight content has completed rendering in the content display area 1304 of the UI 1400, the player module 310 can automatically toggle the screens back so that the next scene (whether a non-highlight or highlight scene) is displayed in the display area 1304. In some embodiments, when such toggling occurs, or when the highlight is being displayed in the PIP window 1402, once the highlight has completed rendering, the PIP window 1402 can automatically close. In some embodiments, when the PIP window 1402 completes the display of a rendered highlight section, for example, the section associated with tag 1308a, it can automatically begin rendering the next identified highlight, for example, the section associated with tag 1308b.

Figure 15:
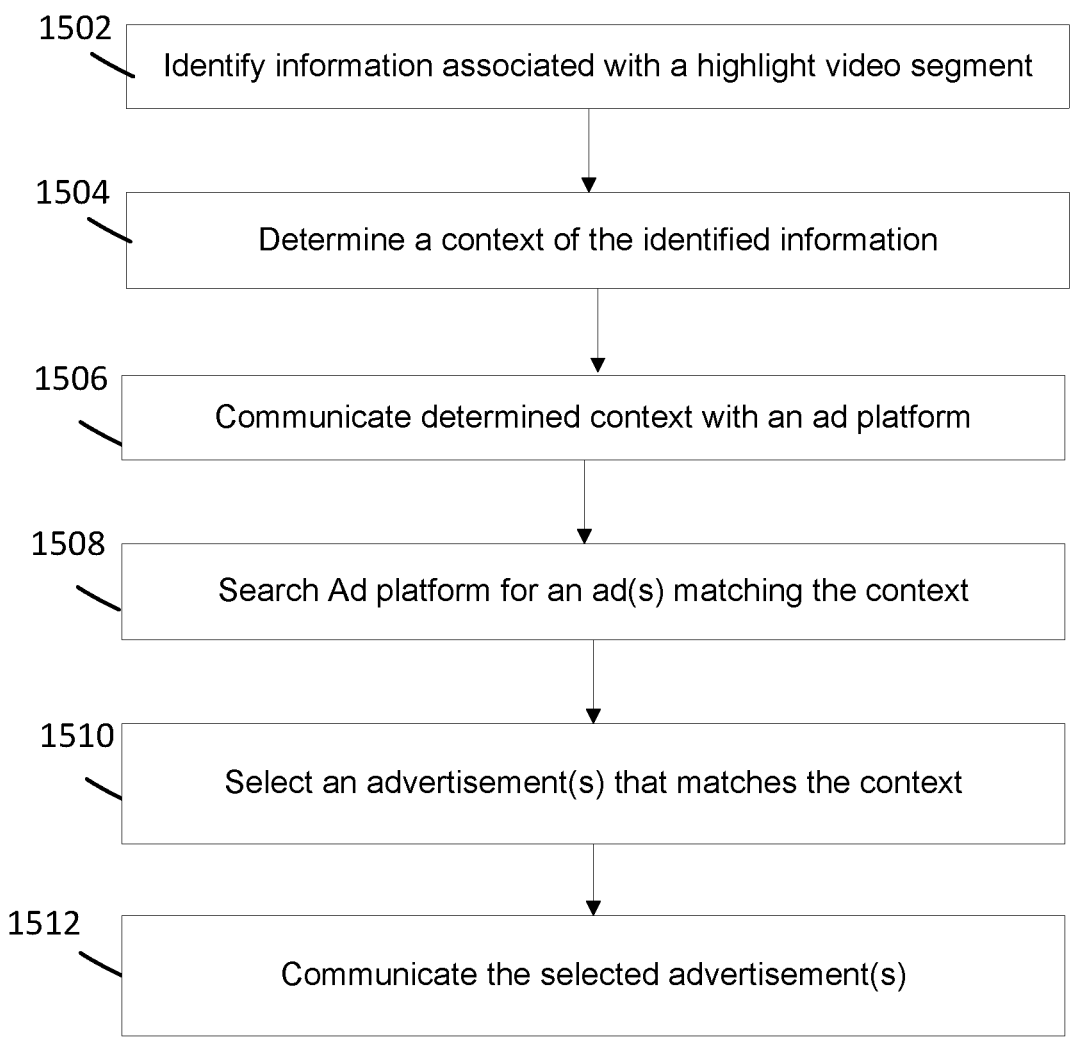
FIG. 15 is a flowchart illustrating steps performed in accordance with some embodiments of the present disclosure.

FIG. 15 is a work flow example 1500 for serving relevant digital content comprising advertisements (e.g., advertisement content) based on the information associated with an identified, created and/or communicated highlight video segment, as discussed above. Such information, referred to as "highlight video segment information" for reference purposes only, can include, but is not limited to, the identity of the video segment within the streaming media (e.g., frames and labels), the attributes of the video segment, the content of the video segment, and the like, and/or some combination thereof.

As discussed herein, reference to an "advertisement" should be understood to include, but not be limited to, digital content that provides information provided by another user, service, third party, entity, and the like. Such digital ad content can include any type of media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities.

By way of a non-limiting example, work flow 1500 includes a user being provided with a highlight video segment from a recent contest of StarCraft® on the Yahoo! eSports® platform, as discussed above. Based on information related to the determination that the highlight video segment is derived from the StarCraft game, for example, the user may be provided with digital ad content related to the purchase of accessories from playing the StarCraft game. In another example, the digital ad content can be related to coupons for locations that sell StarCraft or other like games. In yet another non-limiting example, the digital ad content can be related to promotions provided by Yahoo! ® for the user to set up or upgrade his/her account status within the eSports® platform.

In Step 1502, highlight video segment information associated with a created highlight video segment file is identified. As discussed above, the highlight video segment information can be based on the highlight video segment creation and communication processes outlined above with respect to FIGS. 5, 9, 11 and 12. For purposes of this disclosure, Process 1500 will refer to single highlight video segment, clip or file (whether for a single highlight or a summary of highlights) as the basis for serving an advertisement(s); however, it should not be construed as limiting, as any number of highlight video segments, and/or quantities of information related to users and their interaction with created highlight video segments or streaming media can form such basis, without departing from the scope of the instant disclosure.

In Step 1504, a context is determined based on the identified highlight video segment information. This context forms a basis for serving advertisements related to the highlight video segment information. In some embodiments, the context can be determined by determining a category which the highlight video segment information of Step 702 represents. For example, the category can be related to the type of streaming video from which the highlight video segment was created, and/or can be related to the content type of the highlight video segment file. In some embodiments, the identification of the context from Step 1504 can occur before, during and/or after the analysis detailed above with respect to Processes 500, 900, 1100, 1200, or some combination thereof.

In Step 1506, the context (e.g., content/context data) is communicated (or shared) with an advertisement platform comprising an advertisement server 130 and ad database. Upon receipt of the context, the advertisement server 130 performs a search for a relevant advertisement within the associated ad database. The search for an advertisement is based at least on the identified context.

In Step 1508, the advertisement server 130 searches the ad database for an advertisement(s) that matches the identified context. In Step 1510, an advertisement is selected (or retrieved) based on the results of Step 1508. In some embodiments, the selected advertisement can be modified to conform to attributes of the player, page, message or method upon which the advertisement will be displayed, and/or to the application and/or device for which it will be displayed. In some embodiments, the selected advertisement is shared or communicated via the application the user is utilizing to render the highlight video segment. Step 1512. In some embodiments, the selected advertisement is sent directly to each user's computing device. In some embodiments, the selected advertisement is displayed in conjunction with a displayed highlight video segment on the user's device and/or within the application being used to identify, select and/or render the highlight video segment file.

Figure 16:
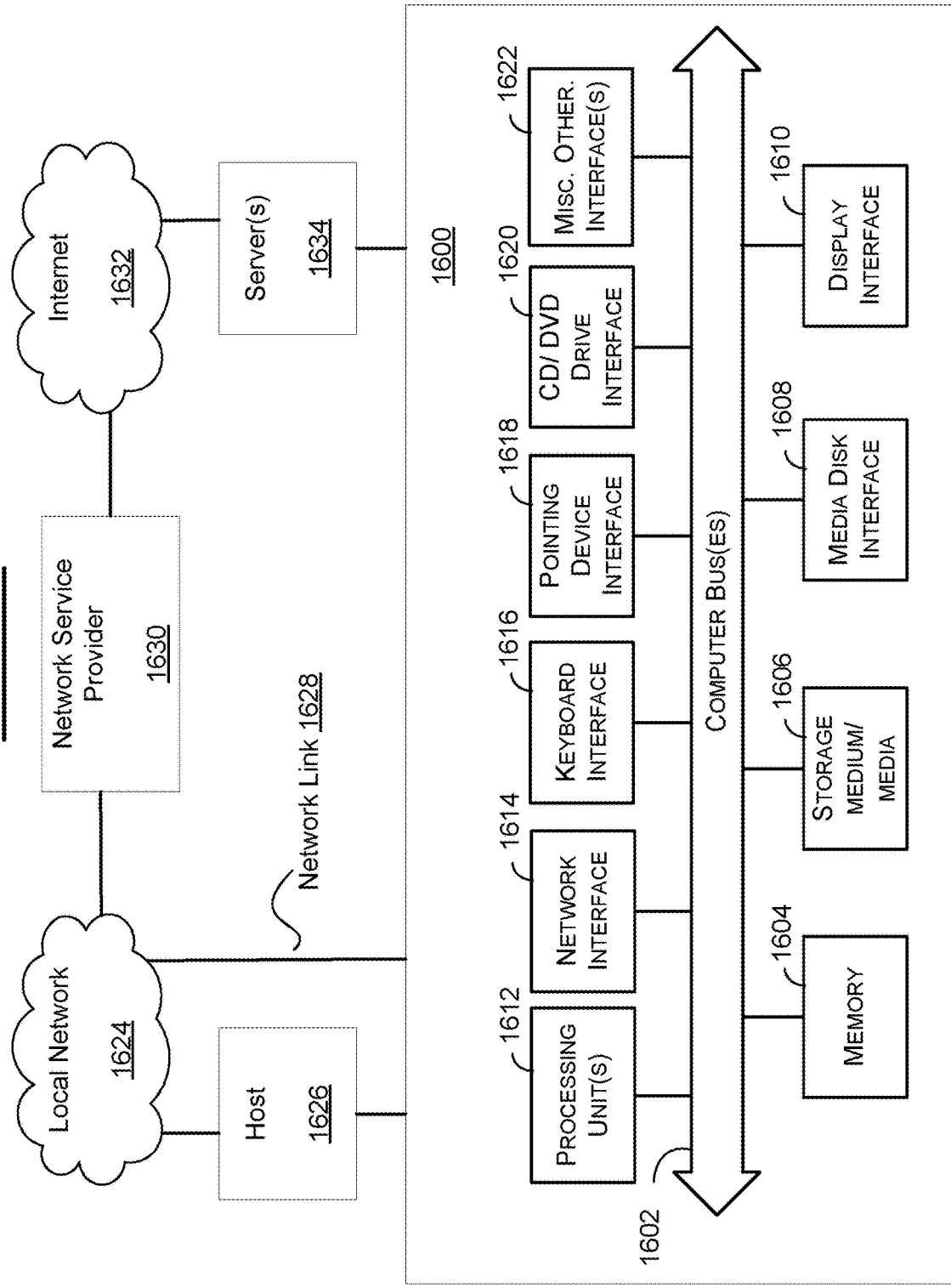
FIG. 16 is a block diagram illustrating the architecture of an exemplary hardware device in accordance with one or more embodiments of the present disclosure.

As shown in FIG. 16, internal architecture 1600 of a computing device(s), computing system, computing platform, user devices, set-top box, smart TV and the like includes one or more processing units, processors, or processing cores, (also referred to herein as CPUs) 1612, which interface with at least one computer bus 1602. Also interfacing with computer bus 1602 are computer-readable medium, or media, 1606, network interface 1614, memory 1604, e.g., random access memory (RAM), run-time transient memory, read only memory (ROM), media disk drive interface 1620 as an interface for a drive that can read and/or write to media including removable media such as floppy, CD-ROM, DVD, media, display interface 1610 as interface for a monitor or other display device, keyboard interface 1616 as interface for a keyboard, pointing device interface 1618 as an interface for a mouse or other pointing device, and miscellaneous other interfaces not shown individually, such as parallel and serial port interfaces and a universal serial bus (USB) interface.

Memory 1604 interfaces with computer bus 1602 so as to provide information stored in memory 1604 to CPU 1612 during execution of software programs such as an operating system, application programs, device drivers, and software modules that comprise program code, and/or computer executable process steps, incorporating functionality described herein, e.g., one or more of process flows described herein. CPU 1612 first loads computer executable process steps from storage, e.g., memory 1604, computer readable storage medium/media 1606, removable media drive, and/or other storage device. CPU 1612 can then execute the stored process steps in order to execute the loaded computer-executable process steps. Stored data, e.g., data stored by a storage device, can be accessed by CPU 1612 during the execution of computer-executable process steps.

Persistent storage, e.g., medium/media 1606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 1628 typically provides information communication using transmission media through one or more networks to other devices that use or process the information. For example, network link 1628 may provide a connection through local network 1624 to a host computer 1626 or to equipment operated by a Network or Internet Service Provider (ISP) 1630. ISP equipment in turn provides data communication services through the public, worldwide packet-switching communication network of networks now commonly referred to as the Internet 1632.

A computer called a server host 1634 connected to the Internet 1632 hosts a process that provides a service in response to information received over the Internet 1632. For example, server host 1634 hosts a process that provides information representing video data for presentation at display 1610. It is contemplated that the components of system 1600 can be deployed in various configurations within other computer systems, e.g., host and server.

At least some embodiments of the present disclosure are related to the use of computer system 1600 for implementing some or all of the techniques described herein. According to one embodiment, those techniques are performed by computer system 1600 in response to processing unit 1612 executing one or more sequences of one or more processor instructions contained in memory 1604. Such instructions, also called computer instructions, software and program code, may be read into memory 1604 from another computer-readable medium 1606 such as storage device or network link. Execution of the sequences of instructions contained in memory 1604 causes processing unit 1612 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 1600. Computer system 1600 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 1602 as it is received, or may be stored in memory 1604 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A computing device for creating a highlight video file, comprising:
    a processor; and
    a non-transitory computer-readable storage medium for tangibly storing thereon program logic for execution by the processor, the program logic comprising:
        logic executed by the processor for receiving a streaming media file associated with a live broadcast of an event, said streaming media file comprising a plurality of frames of content;
        logic executed by the processor for automatically analyzing each frame of the streaming media file as it is received via processor executed artificial neural network (ANN) software, said analysis comprising applying a stored index file to each individual frame using the ANN software to determine a plurality of sets of frames from the received frames that correspond to game scene and a non-game scene, said index file comprising information providing indications as to types of content that are game scenes and non-game scenes, such that the game scenes comprise content depicting game play of the event and the non-game scenes comprise content not corresponding to the game play of the event;
logic executed by the processor for analyzing the sets of frames for each game scene, said analysis comprising applying Convolutional Neural Network (CNN) image classification software to each game scene set of frames and identifying attributes of content within each game scene set of frames, said analysis further comprising computing a score via the CNN image classification software based on said attributes of the content within each set of frames;
logic executed by the processor for determining at least one highlight from said game scenes based on said analysis, said highlight determination comprising comparing said computed scores against a threshold and identifying which game scenes satisfy said threshold, the content of the threshold satisfying game scenes comprising event activity associated with deciding an outcome of the event; and
logic executed by the processor for automatically generating at least one highlight video clip based on said at least one highlight determination, each highlight video clip comprising said set of frames associated with the threshold satisfying game scenes.

2. The computing device of claim 1, wherein said information within the index file is based on a log file associated with said event, said log file comprising information indicating all of the activity information that occurred in said event.

3. The computing device of claim 1, wherein said information within said index file comprises labels determined from a predetermined set of machine learned attributes of content, said labels indicating whether said content is a game scene or a non-game scene, wherein said determination based on the index file further comprises applying said labels to said sets of frames.

4. The computing device of claim 1, further comprising:
logic executed by the processor for communicating, over a network, said at least one highlight video clip to a user, said communication occurring automatically upon generation of said at least one highlight video clip.

5. The computing device of claim 1, further comprising:
logic executed by the processor for parsing each determined plurality of set of frames and identifying data and metadata associated with each frame set, said data and metadata comprising information related to said attributes of content within each set of frames;
logic executed by the processor for translating, via processor applied vector analysis software, each set of data and metadata into individual feature vectors, each feature vector comprising information indicating a relationship of said data and metadata to said content and said set of frames; and
logic executed by the processor for storing said feature vector in a searchable database associated with said computing device.

6. The computing device of claim 1, wherein said streaming media file further comprises an index file that controls how said plurality of frames are streamed and received by said computing device.

7. The computing device of claim 1, further comprising:
logic executed by the processor for receiving instructions to render a stored version of the streaming media file, said instructions comprising a total playback time for said rendering of the stored version;
logic executed by the processor for determining a number of highlight and non-highlight sections in the stored media file, said determination based upon said determination of said at least one highlight from said game scenes;
logic executed by the processor for determining a playback speed of the media file that corresponds to the total playback time based on said determination of said number of highlight and non-highlight sections in the stored media file, said playback speed comprising a first playback rate associated with the non-highlight sections and a differing second playback rate for said highlight sections; and
logic executed by the processor for rendering the stored media file based on said determined playback speed.

8. The computing device of claim 1, further comprising:
logic executed by the processor for determining a context of a highlight video clip, said context based on said event activity;
logic executed by the processor for causing communication, over a network, of said context to an advertisement platform to obtain digital advertisement content associated with said context; and
logic executed by the processor for communicating a digital content object comprising said identified digital advertisement content with said highlight video clip to a user.

9. A method comprising:
receiving, by a computing device, a streaming media file associated with a live broadcast of an event, said streaming media file comprising a plurality of frames of content;
automatically analyzing, by the computing device, each frame of the streaming media file as it is received via processor executed artificial neural network (ANN) software, said analysis comprising applying a stored index file to each individual frame using the ANN software to determine a plurality of sets of frames from the received frames that correspond to game scene and a non-game scene, said index file comprising information providing indications as to types of content that are game scenes and non-game scenes, such that the game scenes comprise content depicting game play of the event and the non-game scenes comprise content not corresponding to the game play of the event;
analyzing, by the computing device, the sets of frames for each game scene, said analysis comprising applying Convolutional Neural Network (CNN) image classification software to each game scene set of frames and identifying attributes of content within each game scene set of frames, said analysis further comprising computing a score via the CNN image classification software based on said attributes of the content within each set of frames;
determining, by the computing device, at least one highlight from said game scenes based on said analysis, said highlight determination comprising comparing said computed scores against a threshold and identifying which game scenes satisfy said threshold, the content of the threshold satisfying game scenes comprising event activity associated with deciding an outcome of the event;
automatically generating, by the computing device, at least one highlight video clip based on said at least one highlight determination, each highlight video clip comprising said set of frames associated with the threshold satisfying game scenes; and communicating, over a network, said at least one highlight video clip to a user, said communication occurring automatically upon generation of said at least one highlight video clip.

10. The method of claim 9, wherein said information within the index file is based on a log file associated with said event, said log file comprising information indicating all of the activity information that occurred in said event.

11. The method of claim 9, wherein said information within said index file comprises labels determined from a predetermined set of machine learned attributes of content, said labels indicating whether said content is a game scene or a non-game scene, wherein said determination based on the index file further comprises applying said labels to said sets of frames.

12. The method of claim 9, further comprising:
parsing each determined plurality of set of frames and identifying data and metadata associated with each frame set, said data and metadata comprising information related to said attributes of content within each set of frames;
translating, via applied vector analysis software, each set of data and metadata into individual feature vectors, each feature vector comprising information indicating a relationship of said data and metadata to said content and said set of frames; and
storing said feature vector in a searchable database associated with said computing device.

13. The method of claim 9, wherein said streaming media file further comprises an index file that controls how said plurality of frames are streamed and received by said computing device.

14. The method of claim 9, further comprising:
receiving instructions to render a stored version of the streaming media file, said instructions comprising a total playback time for said rendering of the stored version;
determining a number of highlight and non-highlight sections in the stored media file, said determination based upon said determination of said at least one highlight from said game scenes;
determining a playback speed of the media file that corresponds to the total playback time based on said determination of said number of highlight and non-highlight sections in the stored media file, said playback speed comprising a first playback rate associated with the non-highlight sections and a differing second playback rate for said highlight sections; and
rendering the stored media file based on said determined playback speed.

15. A non-transitory computer-readable medium tangibly encoded with computer-executable instructions, that when executed by a computing device, perform a method comprising:
receiving, by the computing device, a streaming media file associated with a live broadcast of an event, said streaming media file comprising a plurality of frames of content;
automatically analyzing, by the computing device, each frame of the streaming media file as it is received via processor executed artificial neural network (ANN) software, said analysis comprising applying a stored index file to each individual frame using the ANN software to determine a plurality of sets of frames from the received frames that correspond to game scene and a non-game scene, said index file comprising information providing indications as to types of content that are game scenes and non-game scenes, such that the game scenes comprise content depicting game play of the event and the non-game scenes comprise content not corresponding to the game play of the event;
analyzing, by the computing device, the sets of frames for each game scene, said analysis comprising applying Convolutional Neural Network (CNN) image classification software to each game scene set of frames and identifying attributes of content within each game scene set of frames, said analysis further comprising computing a score via the CNN image classification software based on said attributes of the content within each set of frames;
determining, by the computing device, at least one highlight from said game scenes based on said analysis, said highlight determination comprising comparing said computed scores against a threshold and identifying which game scenes satisfy said threshold, the content of the threshold satisfying game scenes comprising event activity associated with deciding an outcome of the event;
automatically generating, by the computing device, at least one highlight video clip based on said at least one highlight determination, each highlight video clip comprising said set of frames associated with the threshold satisfying game scenes; and
communicating, over a network, said at least one highlight video clip to a user, said communication occurring automatically upon generation of said at least one highlight video clip.

16. The non-transitory computer-readable medium of claim 15, wherein said information within the index file is based on a log file associated with said event, said log file comprising information indicating all of the activity information that occurred in said event.

17. The non-transitory computer-readable medium of claim 15, wherein said information within said index file comprises labels determined from a predetermined set of machine learned attributes of content, said labels indicating whether said content is a game scene or a non-game scene, wherein said determination based on the index file further comprises applying said labels to said sets of frames.

18. The non-transitory computer-readable medium of claim 15, further comprising:
logic executed by the processor for parsing each determined plurality of set of frames and identifying data and metadata associated with each frame set, said data and metadata comprising information related to said attributes of content within each set of frames;
logic executed by the processor for translating, via processor applied vector analysis software, each set of data and metadata into individual feature vectors, each feature vector comprising information indicating a relationship of said data and metadata to said content and said set of frames; and
logic executed by the processor for storing said feature vector in a searchable database associated with said computing device.

19. The non-transitory computer-readable medium of claim 15, wherein said streaming media file further comprises an index file that controls how said plurality of frames are streamed and received by said computing device.

20. The non-transitory computer-readable medium of claim 15, further comprising:
logic executed by the processor for receiving instructions to render a stored version of the streaming media file, said instructions comprising a total playback time for said rendering of the stored version;

logic executed by the processor for determining a number of highlight and non-highlight sections in the stored media file, said determination based upon said determination of said at least one highlight from said game scenes;

logic executed by the processor for determining a playback speed of the media file that corresponds to the total playback time based on said determination of said number of highlight and non-highlight sections in the stored media file, said playback speed comprising a first playback rate associated with the non-highlight sections and a differing second playback rate for said highlight sections; and logic executed by the processor for rendering the stored media file based on said determined playback speed.

\* \* \* \* \*